US012732486B2

(12) United States Patent
Kneckt et al.

(10) Patent No.: US 12,732,486 B2
(45) Date of Patent: Sep. 8, 2026

(54) OBFUSCATION IN PRIVACY BEACON

(71) Applicant: Apple Inc., Cupertino, CA (US)

(72) Inventors: Jarkko L. Kneckt, Los Gatos, CA (US); Debashis Dash, San Jose, CA (US); Elliot S. Briggs, Carmel, CA (US); Nisan Reuven, Rehovot (IL); Qi Wang, Sunnyvale, CA (US); Sidharth R. Thakur, San Jose, CA (US); Su Khiong Yong, Palo Alto, CA (US); Yong Liu, Campbell, CA (US); Tianyu Wu, Monterey, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/231,641

(22) Filed: Aug. 8, 2023

(65) Prior Publication Data

US 2024/0048531 A1 Feb. 8, 2024

Related U.S. Application Data

(60) Provisional application No. 63/396,221, filed on Aug. 8, 2022.

(51) Int. Cl.
*H04L 9/40* (2022.01)
*H04L 5/00* (2006.01)
(Continued)

(52) U.S. Cl.
CPC ........ *H04L 63/0421* (2013.01); *H04L 5/0048* (2013.01); *H04W 12/02* (2013.01); *H04W 12/037* (2021.01)

(58) Field of Classification Search
None
See application file for complete search history.

(56) References Cited

U.S. PATENT DOCUMENTS 7,801,095 B2 9/2010 Kil
11,522,695 B2 12/2022 Hariharan et al.
(Continued)

FOREIGN PATENT DOCUMENTS

CN 105706505 A 6/2016
CN 106060809 A 10/2016
(Continued)

OTHER PUBLICATIONS

U.S. Appl. No. 18/231,566, "Final Office Action", Oct. 27, 2025, 20 pages.
(Continued)

*Primary Examiner* — Philip J Chea
*Assistant Examiner* — James Ross Hollister
(74) *Attorney, Agent, or Firm* — Kilpatrick Townsend & Stockton LLP

(57) ABSTRACT

Techniques are disclosed for obfuscation in a privacy beacon. An example method includes a first communication device creating a beacon field to be included in a beacon frame. The first communication device can generate a timing synchronization field to be included in the beacon frame. The first communication device can apply an offset to the timing synchronization field of the beacon frame. The first communication device can transmit the beacon frame to a second communication device, the beacon frame comprising the offset timing synchronization field and the beacon field.

20 Claims, 28 Drawing Sheets

(51) Int. Cl.

| | |
|---|---|
| ***H04W 12/02*** | (2009.01) |
| ***H04W 12/037*** | (2021.01) |

(56) References Cited

U.S. PATENT DOCUMENTS

| | | | | |
|---|---|---|---|---|
| 2008/0219452 | A1 | 9/2008 | Lu et al. | |
| 2011/0178862 | A1 | 7/2011 | Daigle | |
| 2013/0294232 | A1 | 11/2013 | Segev et al. | |
| 2014/0105097 | A1 | 4/2014 | Liu | |
| 2015/0271667 | A1 | 9/2015 | Bernsen | |
| 2016/0029377 | A1 | 1/2016 | Masuda et al. | |
| 2016/0337783 | A1 | 11/2016 | Seok | |
| 2017/0094587 | A1 | 3/2017 | Ding et al. | |
| 2017/0142604 | A1 | 5/2017 | Reial et al. | |
| 2017/0164387 | A1 | 6/2017 | Lou et al. | |
| 2020/0169977 | A1 | 5/2020 | Agardh | |
| 2020/0244325 | A1* | 7/2020 | Motozuka | H04W 48/16 |
| 2021/0105579 | A1 | 4/2021 | Akkarakaran et al. | |
| 2022/0247726 | A1* | 8/2022 | Mooney | H04L 9/0891 |
| 2022/0303893 | A1 | 9/2022 | Chu | |
| 2022/0329510 | A1 | 10/2022 | Barrett et al. | |
| 2023/0098093 | A1* | 3/2023 | Hawkes | H04W 12/06 370/338 |
| 2023/0328669 | A1* | 10/2023 | Naik | H04W 56/0015 370/350 |

FOREIGN PATENT DOCUMENTS

| | | | | |
|---|---|---|---|---|
| CN | 112825520 | A | 5/2021 | |
| WO | 2019139627 | A1 | 7/2019 | |
| WO | WO-2024008841 | A1 * | 1/2024 | H04L 63/0407 |

OTHER PUBLICATIONS

U.S. Appl. No. 18/231,566, "Non-Final Office Action", Apr. 11, 2025, 17 pages.
"Machine translation of CN 112825520 A", May 21, 2021, 18 pages.
"Machine translation of WO 2019139627 A1", Jul. 18, 2019, 17 pages.
U.S. Appl. No. 18/231,566, "Non-Final Office Action", May 28, 2026, 22 pages.

* cited by examiner

200

| PRIVACY SUPPORT LEVEL | FIELDS WITH OFFSET |
|---|---|
| ASSOCIATION PRIVACY ENH. (APE) 202 | NONE |
| ASSOCIATION PRIVACY ENH. PLUS (APE+) 204 | STA ADDRESS, SN AND PN |
| CLIENT PRIVACY ENH. (CPE) 206 | IN UNICAST FRAMES, ALL MAC FIELDS, EXCEPT DURATION AND SELECTED SUBFIELDS OF FRAME CONTROL FIELD |
| BSS PRIVACY ENH. (BPE) 208 | ALL FIELDS, EXCEPT MAC FIELDS REQUIRED FOR INTEROPERABILITY |

| | FRAME CONTROL 302 | DURACTION/ID 304 | ADD. 1 306 | ADD. 2 308 | ADD. 3 310 | SEQUENCE CONTROL 312 | ADD. 4 314 | QOS CONTROL 316 | HT CONTROL 318 | CCMP HEADER 320 | A-MSDU HEADER 322 | DATA PAYLOAD 324 | MIC 326 | FCS 328 |
|---|---|---|---|---|---|---|---|---|---|---|---|---|---|---|
| APE + FIELD PROTECTIONS | | | OFFSET APPLIED TO STA ADD. | | | | OFFSET APPLIED TO STA ADD. | NO OBFUSCATION | | OBF. | | | | |
| CPE FIELD PROTECTIONS | | CLEAR | OFFSET APPLIED TO STA ADD. | | | OFFSET APPLIED | OFFSET APPLIED TO STA ADD. | OBFUSCATION | | OBF. | ENCRYPTED | | CLEAR FIELD, CALCULATED FROM OTA VALUES | |
| BPE FIELD PROTECTIONS | | | OFFSET APPLIED | | | | OFFSET APPLIED | OBFUSCATION | | OBF. | | | | |

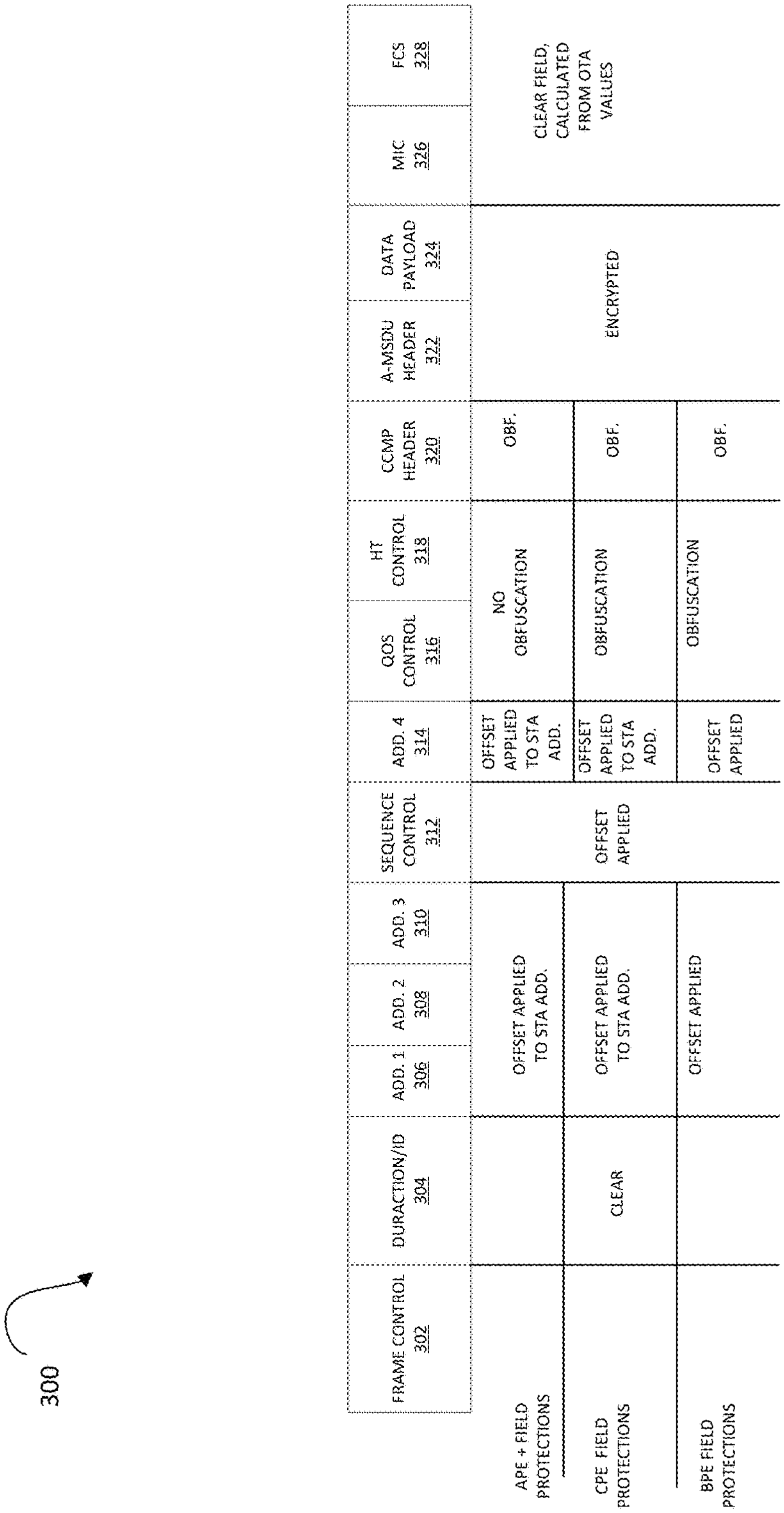

| Bits | Field | Bits: |
|---|---|---|
| B0 B1 | PROTOCOL VERSION 402 | 2 |
| B2 B3 | TYPE 404 | 2 |
| B4 B7 | SUBTYPE 406 | 4 |
| B8 | TO DS 408 | 1 |
| B9 | FROM DS 410 | 1 |
| B10 | MORE FRAG-MENTS 412 | 1 |
| B11 | RETRY 414 | 1 |
| B12 | POWER MANAGEMENT 416 | 1 |
| B13 | MORE DATA 418 | 1 |
| B14 | A-MSDU CONTROL 420 | 1 |
| B15 | PROTECTED FRAME 422 | 1 |
| B16 | +HTC 424 | 1 |

| | B0–B7 | B8–B9 | B10–B16 |
|---|---|---|---|
| APE + FIELD PROTECTIONS | CLEAR | NO OBFUSCATION | NO OBFUSCATION |
| CPE FIELD PROTECTIONS | CLEAR | NO OBFUSCATION | OBFUSCATION |
| BPE FIELD PROTECTIONS | CLEAR | OBFUSCATION | OBFUSCATION |

700

| FIELD | ALTERNATIVE 1 OBFUSCATE ALL FIELDS 702 | ALTERNATIVE 2 OBFUSCATE AND ENCRYPT 704 |
|---|---|---|
| PROTOCOL VERSION, TYPE, SUBTYP DURATION I/D, FCS | TRANSMITTED CLEAR OTA. NEEDED FOR CORRECT WLAN | |
| ADDRESS 1-4, TID, SN | THE FIELDS ARE OBFUSCATED. AN OFFSET VALUE IS ADDED TO THE FIELDS | |
| PN, A-MDSU PRESENT | THE FIELDS ARE OBFUSCATED. AN OFFSET VALUE IS ADDED TO THE FIELDS | THE FIELDS ARE ENCRYPTED |
| POWER MGT, MORE DATA, EOSP, +HTC, HT CONTROL | | |
| RETRY (NOT RELEVANT FOR PRIVACY) | SET TO 0 OR TRANSMITTED CLEAR OTA | |

| | FRAME CONTROL 802 | DURATION/ID 804 | ADD. 1 806 | ADD. 2 808 | ADD. 3 810 | SEQUENCE CONTROL 812 | ADD. 4 814 | QOS CONTROL 816 | HT CONTROL 818 | CCMP HEADER 820 | A-MSDU HEADER 822 | DATA PAYLOAD 824 | MIC 826 | FCS 828 |
|---|---|---|---|---|---|---|---|---|---|---|---|---|---|---|
| APE + FIELD PROTECTIONS | | NO OFFSET | OFFSET APPLIED TO STA ADD. | | | OFFSET APPLIED | OFFSET APPLIED TO STA ADD. | NO OFFSET | | OFFSET APPLIED | ENCRYPTED | | CLEAR FIELD, CALCULATED FROM OTA VALUES | |
| CPE FIELD PROTECTIONS | | | OFFSET APPLIED TO STA ADD. | | | | OFFSET APPLIED TO STA ADD. | OFFSET APPLIED | | | | | | |
| BPE FIELD PROTECTIONS | | | OFFSET APPLIED | | | | OFFSET APPLIED | OFFSET APPLIED | | | | | | |

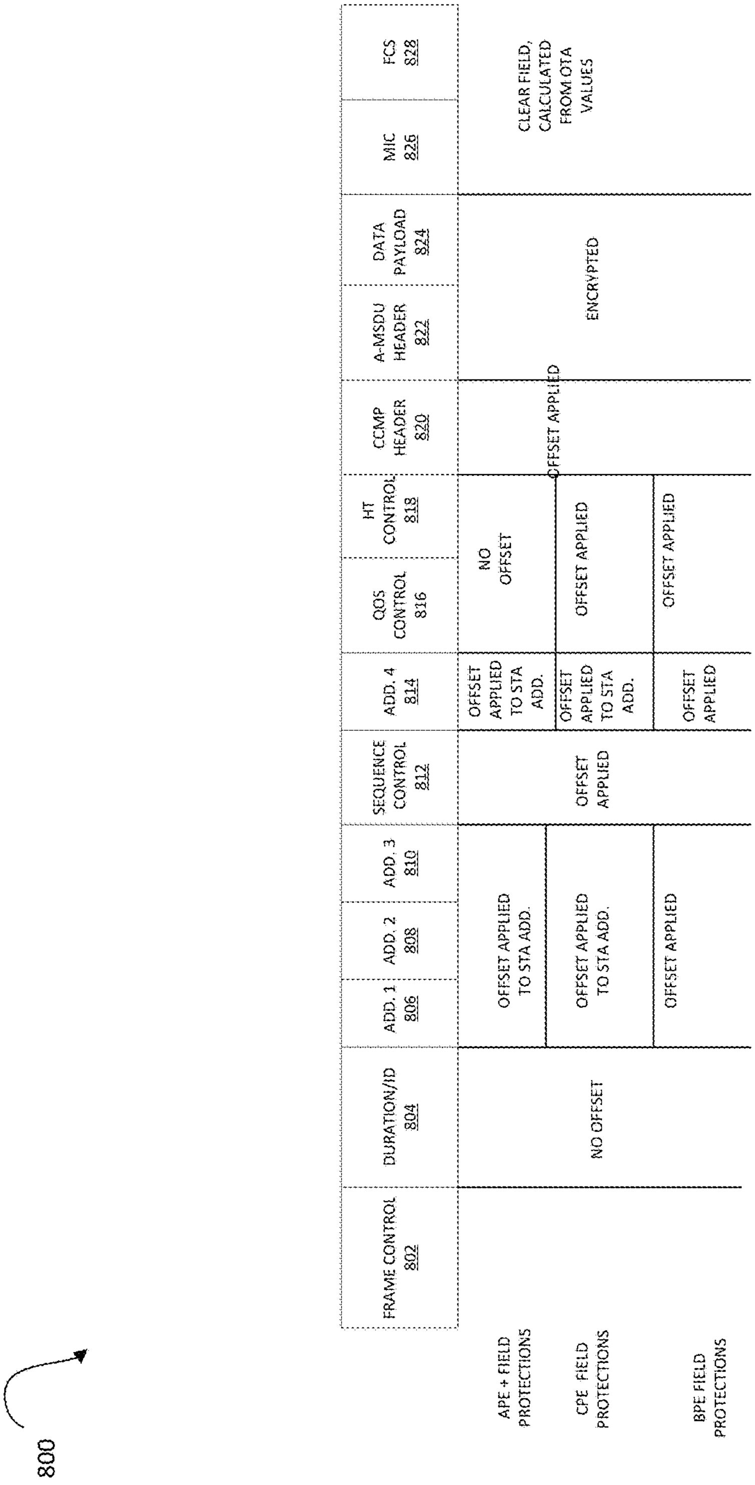

| | B0 B1 | B2 B3 | B4 B7 | B8 | B9 | B10 | B11 | B12 | B13 | B14 | B15 | B16 |
|---|---|---|---|---|---|---|---|---|---|---|---|---|
| | PROTOCOL VERSION 902 | TYPE 904 | SUBTYPE 906 | TO DS 908 | FROM DS 910 | MORE FRAG-MENTS 912 | RETRY 914 | POWER MANAGEMENT 916 | MORE DATA 918 | A-MSDU CONTROL 920 | PROTECTED FRAME 922 | +HTC 924 |
| Bits: | 2 | 2 | 4 | 1 | 1 | 1 | 1 | 1 | 1 | 1 | 1 | 1 |
| APE + FIELD PROTECTIONS | NO OFFSET | | | NO OFFSET | | NO OFFSET | | | | | | |
| CPE FIELD PROTECTIONS | | | | NO OFFSET | | OFFSET APPLIED | | | | | | |
| BPE FIELD PROTECTIONS | | | | OFFSET APPLIED | | OFFSET APPLIED | | | | | | |

1000

| OFFSET CHANGE TIME | SUITABLE FOR | SUITABILITY, IF USED A SALT | HOW OFFSET IS RANDOMIZED |
|---|---|---|---|
| PER PPDU 1002 | SHORT TERM SALT VALUE | ALL MAC HEADER FIELD OF BPE, CPE | SCRAMBLER SEED IN SERVICE FIELD IS USED TO RANDOMIZE THE PREAMBLE |
| PER TBTT 1004 | LONG TERM SALT VALUE | | |
| LONGER PERIOD 30S ->15 MIN 1006 | | ADDRESSES, SN, TID AND PN OF MAC HEADERS OF BPE AND CPE | BEACON SN/TBTT NUMBER IS USED IN OFFSET CALCULATION |
| | | | PRECONFIGURED VALUE IS USED AS OFFSET |

| PPDU TYPE | RECEIVER IDENTIFICATION | NUMBER OF KEYS IN OFFSET HANDLING |
|---|---|---|
| LEGACY SU PPDU | MAC HEADERS | 1 FOR AP (ALL STAS SHARE THE SAME KEY FOR UL FRAMES) 1 FOR EACH ASSOCIATED STA (DL TRANSMISSIONS MAC HEADERS ARE ENCRYPTED BY STA SPECIFIC KEY) 1202 |
| HE SU PPDU | BSS COLOR FIELD + MAC HEADERS | |
| MU PPDU | BSS COLOR + AID + MAC HEADERS | AP MAY HAVE A SEPARATE KEY FOR EACH STA. EACH STA HAS 1 KEY. IN SOME DEPLOYMENTS THE AP AND STA (UL & DL) MAY USE THE SAME KEY 1204 |
| TB PPDU | TRIGGERED STA DETERMINATION FROM A TRIGGER FRAME, THE TA MAC ADDRESS, AND AID AND BSS COLOR FIELD OF RU. AP ASSUMES THAT ONLY THE CORRECT STA RESPONDS (ONE RX ONLY | |

FIG. 12

OBFUSCATION IN PRIVACY BEACON

CROSS-REFERENCE TO RELATED APPLICATIONS

This application claims the benefit of U.S. Provisional Application No. 63/396,221, filed on Aug. 8, 2022, which is incorporated by reference.

BACKGROUND

A wireless network is a communication network that enables computing devices to communicate through radio transmissions and receptions between network nodes. These wireless networks permit users with greater mobility within the home and office environments by untethering their computing device from wired communication.

BRIEF DESCRIPTION OF THE DRAWINGS

FIG. 2 is a table directed to example medium access control (MAC) header fields and privacy protection for each field, according to one or more embodiments.

FIG. 3 is an illustration of an example frame with offset descriptions, according to one or more embodiments.

FIG. 7 is an example table describing two alternatives for obfuscation and encryption, according to one or more embodiments.

FIG. 8 is an illustration of an example frame associated with obfuscation of MAC header bits and A-control field, according to one or more embodiments.

FIG. 10 is an example table describing offset bit-stream randomization interval, according to one or more embodiments.

FIG. 12 is an example table describing the number of keys in secure scrambling, according to one or more embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a wireless communication network, a frame can be a unit of data that can be transmitted between nodes. The frame can include the information useful to transmit data from one network node to another, including addressing information and protocol control information. A frame can include a header, a payload, and a trailer. Each of the header, payload, trailer can be configured to convey particular information. For example, a medium access control (MAC) header can be an ethernet header that includes data fields that can be added to a beginning of a network data packet to convert the packet into a frame to be transmitted. The MAC header can include a transmission protocol version, a frame type, a frame subtype, and a frame control flag. Under IEEE 802.11, only the payload of the frame can be encrypted, and therefore and header and trailer remain unencrypted.

A timing synchronization function (TSF) is specified in IEEE 802.11 and provides a mechanism for synchronizing the timers of each device in a basic service set (BSS). The timing synchronization can be achieved by computing devices that periodically exchange timing information through beacon frames. The beacon frame can be transmitted after a target beacon transmission time (TBTT). If, however, a communication channel is busy, reception of the beacon frame may be delayed. As the TSF value in the beacon frame can be time dependent, the delay can cause a change in the TSF value. Under current standards, if a value changes based on a time passing, the entire beacon frame can be encrypted to guard the changed value. Therefore, once the encrypted beacon frame is received, the frame can be decrypted. This decryption process can further add to the delay and can result in synchronization issues.

Embodiments herein address the above referenced issues by providing a separate encryption process for the TSF value. The value in the TSF field can be encrypted by applying an offset to the TSF field. A device can then separately encrypt the beacon frame contents without encrypting the TSF as the offset has already been applied. The device can transmit the beacon frame to another device and even if the TSF field changes, the TSF field does not need to be encrypted as the offset has been applied.

Figure 1:
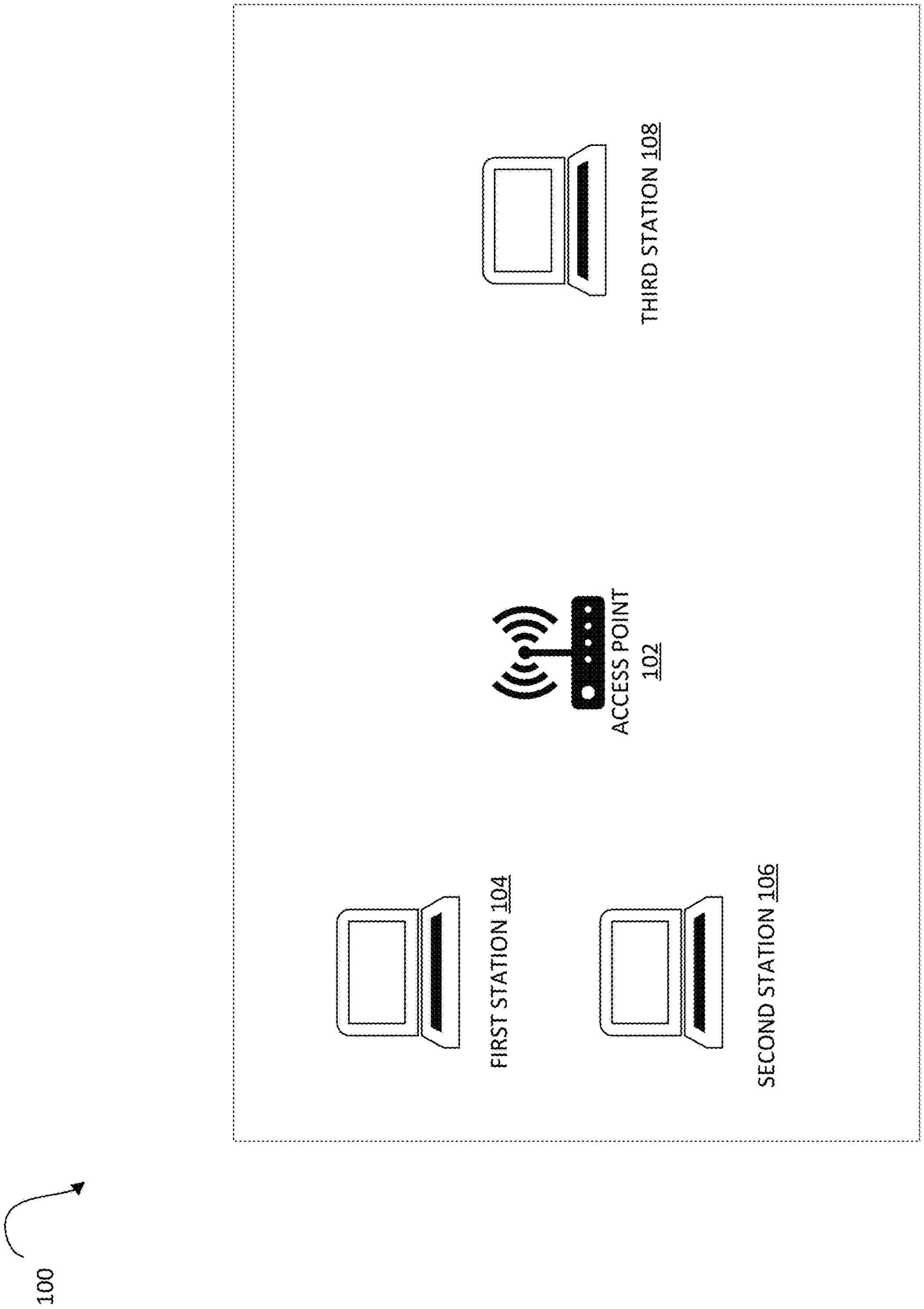
FIG. 1 is an illustration of an example environment with an access point (AP) and station (STA), according to one or more embodiments.

FIG. 1 is an environment 100 with an access point (AP) and several computing devices (also called stations (STAs)), according to one or more embodiments. The environment 100 includes an AP 102, a first station 104, a second station 106, and a third station 108. The AP can be a device that can create a wireless local area network (WLAN) in the environment. The AP can connect to a wired router, switch, or hub via an Ethernet cable, and project a Wi-Fi signal to the environment 100 (e.g., home or office). Each of the first station 104, the second station 106, and the third station 108 can be a device that has access to the Wi-Fi and can allow transmission and reception of data. Thus, both of the ends of the data sharing process (transmission and reception) can be performed by a station. One station can be from where data is transmitted, and another station can be where the data is received. Various techniques can be implemented to secure the privacy of communications in the environment 100. Embodiments described herein relate to one or more of these techniques.

FIG. 2 is a table 200 directed towards medium access control (MAC) header fields and privacy protection for each field. As indicated above, a first alternative for obfuscation can be to calculate an offset for certain fields of a PPDU frame. A device can select the fields based on a level of privacy enhancement supported by the device. A first device (e.g., AP) and a second device (e.g., STA) can be configured to support different privacy support levels. These privacy support levels include an association privacy enhancement (APE) 202, an APE plus (APE+) 204, client privacy enhancement (CPE) 206, and a basic service set (BSS) privacy enhancement (BPE) 208. A device can choose which fields to offset based on a privacy support level of the device. A device that supports APE 202 does not calculate an offset for any field. A device that supported APE+ 204 can calculate an offset for the STA address, the sequence number (SN), and the packet number (PN). A device that supports CPE 206 can calculate an offset for, in unicast frames, all MAC fields with the exception of duration fields and selected subfields of the frame control field. A device that supports BPE 208 can calculate an offset for all fields with the exception of MAC field needed for interoperability.

FIG. 3 is an illustration of a frame 300 with offset descriptions, according to one or more embodiments. FIG. 3 provides examples of fields that can be selected for obfuscation. The frame 300 can include a field for frame control 302 which is discussed with more detail at FIG. 4. The frame 300 can further include a Duration/ID field 304, which can remain clear regardless of the privacy support level of the device, and where clear means no changes to the values for an over the air (OTA) transmission. The frame 300 can further include a first address (ADD. 1) field 306, a second address (ADD. 2) field 308, and a third address (ADD. 3) field 310. For a device that supports APE+, or CPE, the device can apply an offset to obfuscate the STA address value in any of these fields. For a device that supports BPE, the device can apply an offset to all of the values in all of these fields. The frame 300 can further include a sequence control field 312. For a device that supports any of APE+, CPE, or BPE, the device can apply an offset to obfuscate the values in this field. The frame 300 can further include a fourth address (ADD. 4) field 314. For a device that supports any of APE+, CPE, or BPE, the device can apply an offset to obfuscate the values in this field. The frame 300 can further include a quality of service (QoS) field 316 and HT control field 318. For devices that support APE+, the device does not obfuscate any value in this field. For devices that support CPE or BPE, the device can obfuscate the values in this field, where obfuscation can by applying an offset or by encryption. The frame 300 can further include a field for counter mode cipher block chaining message authentication code protocol (CCMP) field 320. A device that supports any of APE+, CPE, or BPE can obfuscate any value in this field. The frame 300 can further include an aggregation MAC service data unit (A-MDSU) field 322 and a data payload field 324. A device that supports any of APE+, CPE, or BPE can encrypt the values in these fields, where encryption can be defined under IEEE 802.11. The frame 300 can further include a message integrity check (MIC) field 326 and a frame check sequence (FCS) field 328. A device supporting any of APE+, CPE or BPE can clear this field, which can be calculated from OTA values.

Figure 4:
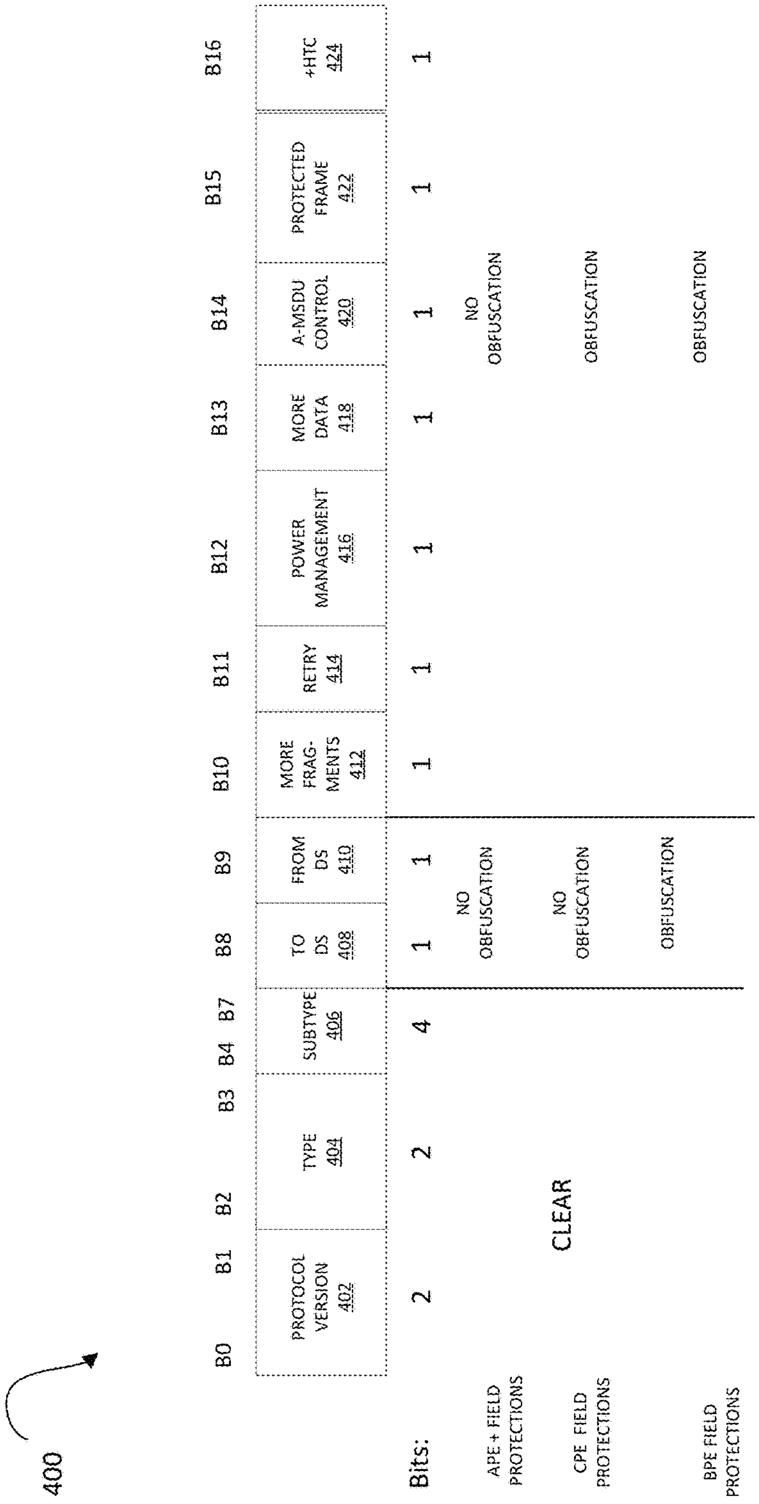
FIG. 4 is an illustration of example subfields of a frame control field, according to one or more embodiments.

FIG. 4 is an illustration of subfields of a frame control field 400, according to one or more embodiments. The frame control field 400 can include a protocol version subfield 402, type subfield 404, and subtype subfield 406. Each of these subfields can remain clear regardless of the privacy support level of the device. The frame control field 400 can include to distribution system (DS) subfield 408 and a from DS subfield 410. The device can elect not to obfuscate the values in these fields for devices that support APE+ or CPE. The device can obfuscate the values for these fields if the device supports BPE. The frame control field 400 can further include for more fragments subfield 412, a retry subfield 414, a power management subfield 416, a more data subfield 418, a A-MDSU control subfield 420, a protected frame subfield 422, and a +HT control subfield 424. For a device that supports any of APE+, the device can elect to not apply obfuscation to any of these fields. For a device that supports any of CPE and BPE, the device can obfuscate the fields.

As described above, the embodiments herein can calculate a single offset for all fields using a single function. In particular, the function can calculate one bit-stream, and then the device can allocate bits from the stream over specific fields to be obfuscated. The bit-stream can have dedicated bits for specific fields. For example, bit 0 of the bit-stream can be dedicated to a first bit of the MAC header. The device can determine how long of a bit-stream to generate based on the fields that can be obfuscated. To obfuscate a field, the device can take the original value and use an XOR function to perform an "exclusive or" with an offset value to calculate the over the air value. An example single function to calculate the offset bit stream can be as follows: $\text{Truncate}_{offsetlength}$(SHA-256(LinkID, "Protection-_Offset", Of_Key, OF_Salt_ST_STA_LT) LinkID can be the Link ID in which the beacon in transmitted. "Protection-_Offset" can be a long plain text. OF-Key can be the key to protect the offset, which can be changed periodically. OF-Salt can be a number that can be changed periodically. There can be two salt values, a long-term value and a short-term value.

Figure 5:
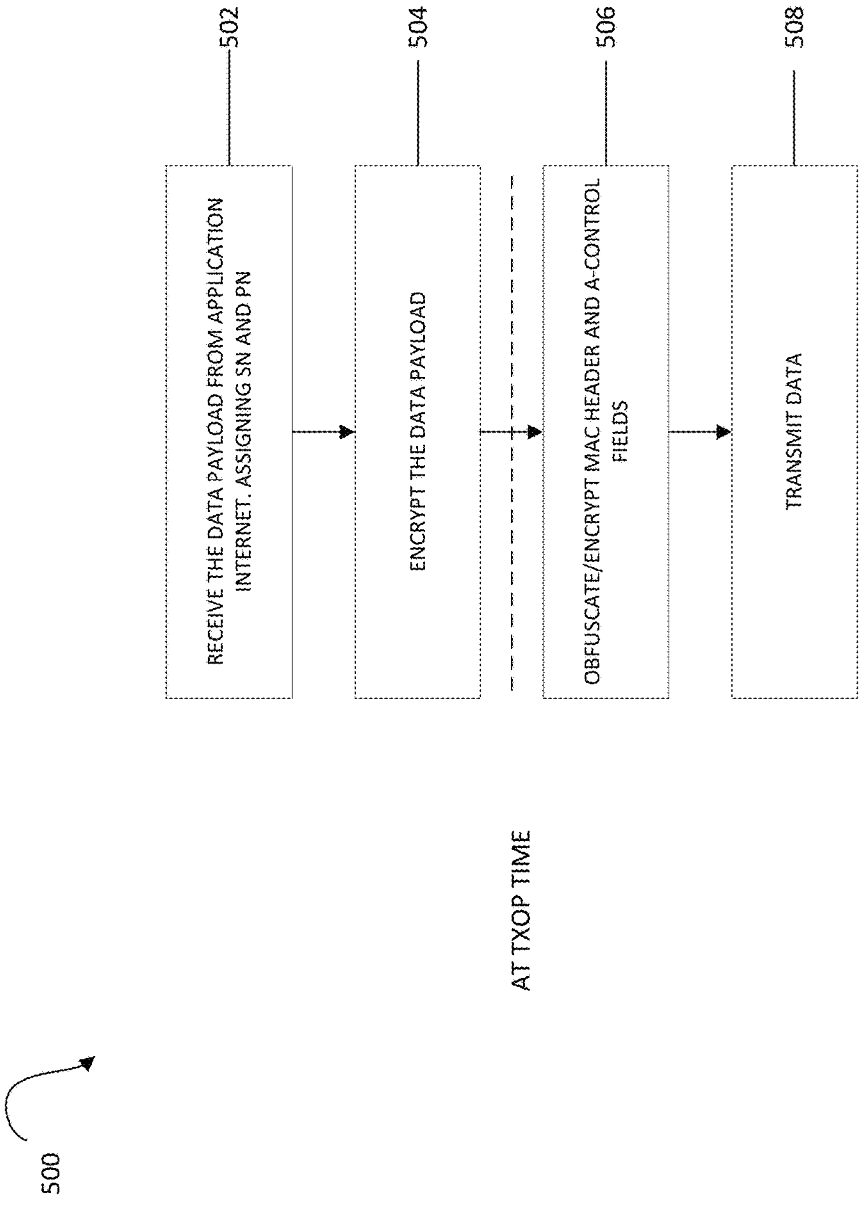
FIG. 5 is an example process flow for a transmitter operation, according to one or more embodiments.

FIG. 5 is a process flow 500 for a transmitter operation, according to one or more embodiments. While the operations of processes 500, 800, 2000, and 2100 are described as being performed by generic computers, it should be understood that any suitable device may be used to perform one or more operations of these processes. Processes 600, 800, 2000, and 2100 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 502, a device can receive a data payload from an application or the internet. The data payload can be included in a physical layer protocol data unit (PPDU) transmission. In response to receiving the data payload, the device can assign the payload a sequence number (SN) and a packet number (PN).

At 504, the device can encrypt the data payload.

At 506, the device can obfuscate and encrypt the MAC header and aggregate control (A-control) fields. In some instances, step 506 can occur at the next transmission opportunity (TXOP) time that occurs after encrypting the payload (step 504).

At 508, the device can transmit the data to a receiving device. For example, the device can be a transmitting device such as an access point and the receiving device can be a station that connects to a wireless local area network provided by the access point.

Figure 6:
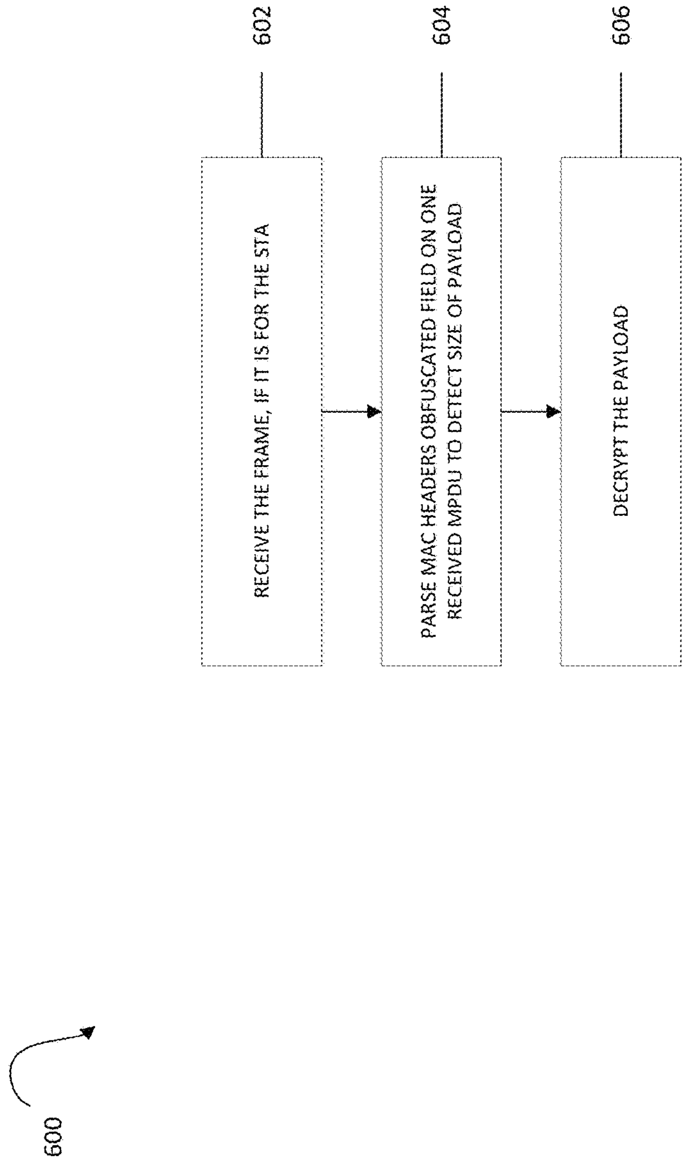
FIG. 6 is an example process flow for a receiver operation, according to one or more embodiments.

FIG. 6 is a process flow 600 for a receiver operation, according to one or more embodiments. At 602, a device can receive a frame from a transmitting device. The device can be, for example, a station in an environment. The device can receive the frame over the air and further determine whether the device is the intended recipient. For example, the device can determine whether the transmitter address and the receiver address match the device information. If there is a match, the device can receive the frame. If there is no match, the device can discard the frame. The device can further determine the duration of the PPDU transmission from the preamble of the frame. The duration can be set in a TXOP field of the preamble or a duration field. The frame can be received, for example, from the device of FIG. 5.

At 604, the device can parse the MAC header's obfuscated fields of a MAC protocol data unit (MPDU) to detect the size of the payload. The device can also use the +HTC field to determine the MAC header size. These values can be used later to assist in decryption of the payload, for example, to determine the size of a scrambler seed. The device can further use the over the air traffic identifier (OTA TID) and address field values of a received MAC protocol data unit to prepare a block acknowledgment frame and send the block acknowledgment a short interframe space (SIFS) after the PPDU. The device can further determine MD/end of service period (EOSP)/power management (PM). In some embodiments, step 604 can be a one-time operation regardless of the number of MAC protocol data units.

At 606, the device can decrypt the payload. In this step, the device can de-obfuscate addresses, packet numbers and sequence numbers for the additional authentication data (AAD) used for the payload decryption. The device can perform step 606 for each MAC protocol data unit that can be received at step 602. Upon decrypting the payload, the device can reorder the decrypted frames using a buffer. The device can then transmit the reordered frames to an application or the internet.

FIG. 7 is a table 700 describing two alternatives for obfuscation and encryption, according to one or more embodiments. As described above, a device can obfuscate or encrypt certain fields based on various parameters. As also described above, the first alternative can include obfuscating certain fields. The table 700 describes which fields the device can select to obfuscate. For the first alternative 702, the protocol version, type, subtype, duration/ID and frame check sequence (FCS) fields can be transmitted clear over the air. The first through fourth address fields, the traffic identifier (TID) field, and the sequence number (SN) fields can be obfuscated by applying the same offset value to each of the fields. The packet number, and aggregated MAC service data unit (A-MSDU) present fields can be obfuscated by applying the same offset value to each of the fields. The power management, more data, end of service period (EOSP)+HTC, and HT control fields can also be obfuscated by applying the same offset value to each of the fields. The retry field can either set to zero or transmitted clear.

For the second alternative 704, the protocol version, type, subtype, duration/ID and frame check sequence (FCS) fields can be transmitted clear over the air. The first through fourth address fields, the traffic identifier (TID) field, and the sequence number (SN) fields can be obfuscated by applying the same offset value to each of the fields. The packet number, and aggregated MAC service data unit (A-MSDU) present, power management, more data, end of service period (EOSP)+HTC, and HT control fields can be encrypted. The retry field can be either set to zero of transmitted clear, or in some embodiment, handled as MD, EOSP or +HTC fields.

FIG. 8 is an illustration of a frame 800 associated with obfuscation of MAC header bits and an A-control field, according to one or more embodiments. For this embodiment, a device can prepare a MAC header and apply the single offset for all appropriate fields. The frame 800 can include a field for frame control 802, which is discussed at FIG. 9. The frame 800 can include a Duration/ID field 804, which can have no offset regardless of the privacy support level of the device. The frame 800 can include a first address (ADD. 1) field 806, a second address (ADD. 2) field 808, and a third address (ADD. 3) field 810. For a device that supports APE+, or CPE, the device can apply an offset to the STA address value in any of these fields. For a device that supports BPE, the device can apply an offset to all of all values in any of these fields. The frame 800 can further include a sequence control field 812. For a device that supports any of APE+, CPE, or BPE, the device can apply an offset to any values in this field. The frame 800 can further include a field for a fourth address (ADD. 4) field 814. For a device that supports any of APE+, CPE, or BPE, the device can apply an offset to a STA address in this field. The frame 800 can further include a quality of service (QoS) field 816 and HT control field 818. For devices that support APE+, the device can not apply an offset to any value in this field. For devices that support CPE or BPE, the device can apply an offset to any values in this field. The frame 800 can further include a Counter Mode Cipher Block Chaining Message Authentication Code Protocol (CCMP) field 820. A device that supports any of APE+, CPE, or BPE can apply an offset any value in this field. The frame 800 can further include an aggregation MAC service data unit (A-MDSU)

field 822 and a data payload field 824. A device that supports any of APE+, CPE, or BPE can encrypt any values in these fields. The frame 800 can further include a message integrity check (MIC) field 826 and a frame check sequence (FCS) field 828. A device supporting any of APE+, CPE or BPE can clear this field, which can be calculated from OTA values.

Figure 9:
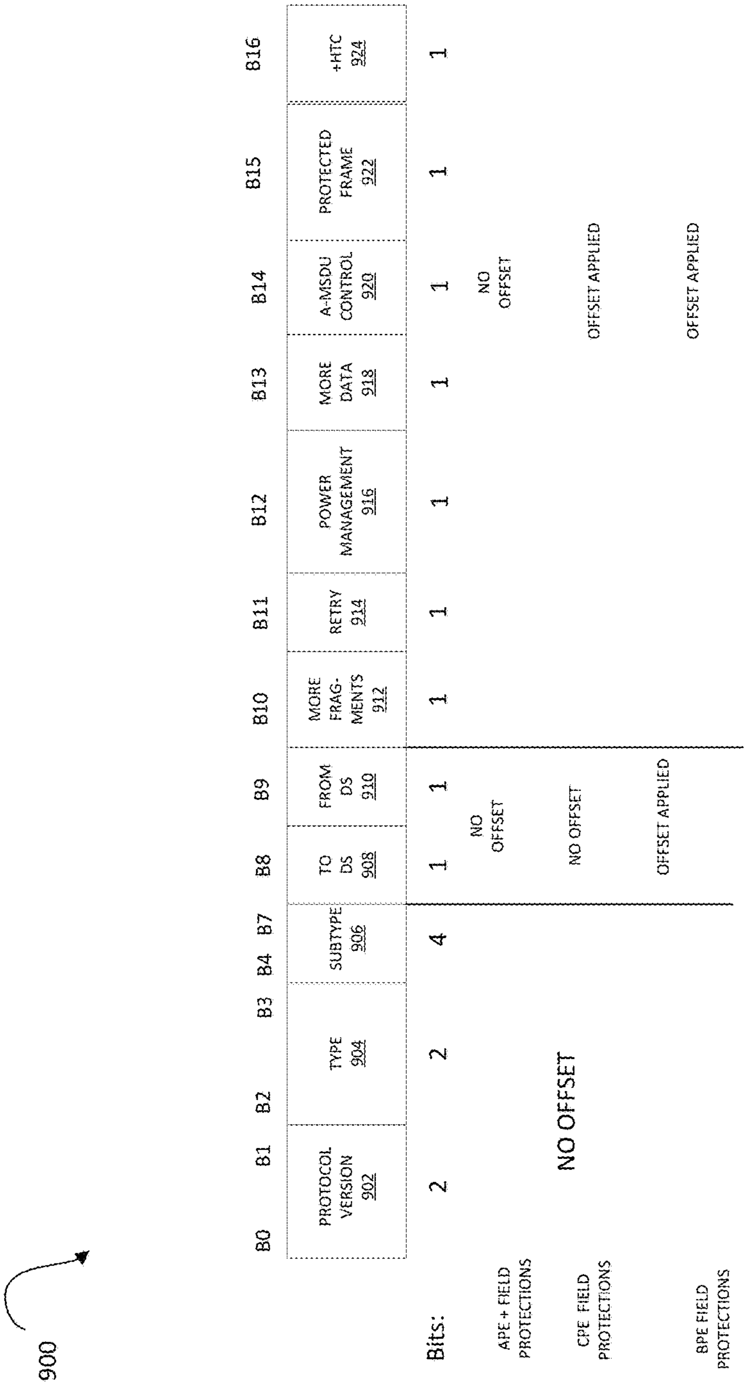
FIG. 9 is an illustration of example subfields of a frame control field, according to one or more embodiments.

FIG. 9 is an illustration of subfields of a frame control field 900, according to one or more embodiments. The frame control field 900 can include a protocol version subfield 902, type subfield 904, and subtype subfield 906. Each of these subfields can have no offset applied regardless of the privacy support level of the device. The frame control field 900 can include a to distribution system (DS) subfield 908 and a from DS subfield 910. The device can elect not to apply an offset to the values in these fields for devices that support APE+ or CPE. The device can apply an offset to the values for these fields for a device that supports BPE. The frame control field 900 can further include a more fragments subfield 912, a retry subfield 914, a power management subfield 916, a more data subfield 918, an A-MDSU control subfield 920, a protected frame subfield 922, and a +HT control subfield 924. For a device that supports APE+, the device can elect not to apply an offset to any of these fields. For a device that supports any of CPE and BPE, the device can obfuscate the fields.

FIG. 10 is a table 1000 describing offset bit-stream randomization interval, according to one or more embodiments. This table 1000 relates to the first alternative. Even if an offset is applied for obfuscation, a malicious attacker can, with time ascertain the offset value through brute force. Therefore, to preserve the integrity of device-to-device communication, a device can, from time to time, change the offset value. Table 1000 provides various options of triggering mechanisms to change an offset value. A first option 1002. can be to change the offset value per PPDU transmission. The first option 1002 can be suitable for short-term salt value, has it would be coupled with a high rate of change due to the number of PPDU transmissions. The first option 1002 can further be suitable for all MAC header fields for devices that support BPE and CPE, as no offset is applied to a QoS control field or HT control field for devices that support APE+. The change to the offset can be effectuated by randomizing the preamble using a scrambler seed. A second option 1004 can be for the offset to change per target beacon transmission time (TBTT), which can be a time interval used to schedule a beacon. This second option 1004 can be suitable for a long-term salt value as the time intervals can be long enough such that the offset is not changed as frequently as on the per PPDU transmission basis. This second option 1004 can be suitable for obfuscating addresses, SN, the TID, and PN of MAC headers associated with devices that support BPE and CPE as offsets are applied to these fields for BPE and CPE supported devices. This option can be effectuated by using the beacon SN/TBTT number as an input into a function to generate the offset value. A third option 1006 can be for the device to change the offset at a time interval (e.g., between 30 s and 15 min). Again, this can be good for a long-term salt due to the infrequency of the change. This third option 1006 can be suitable for obfuscating addresses, SN, the TID, and PN of MAC headers associated with devices that support BPE and CPE as offsets are applied to these fields for BPE and CPE supported devices. The device can effectuate the change in the offset by using a preconfigured value, and the offset change time does not coincide with another signal that can be used as a triggering mechanism.

Figure 11:
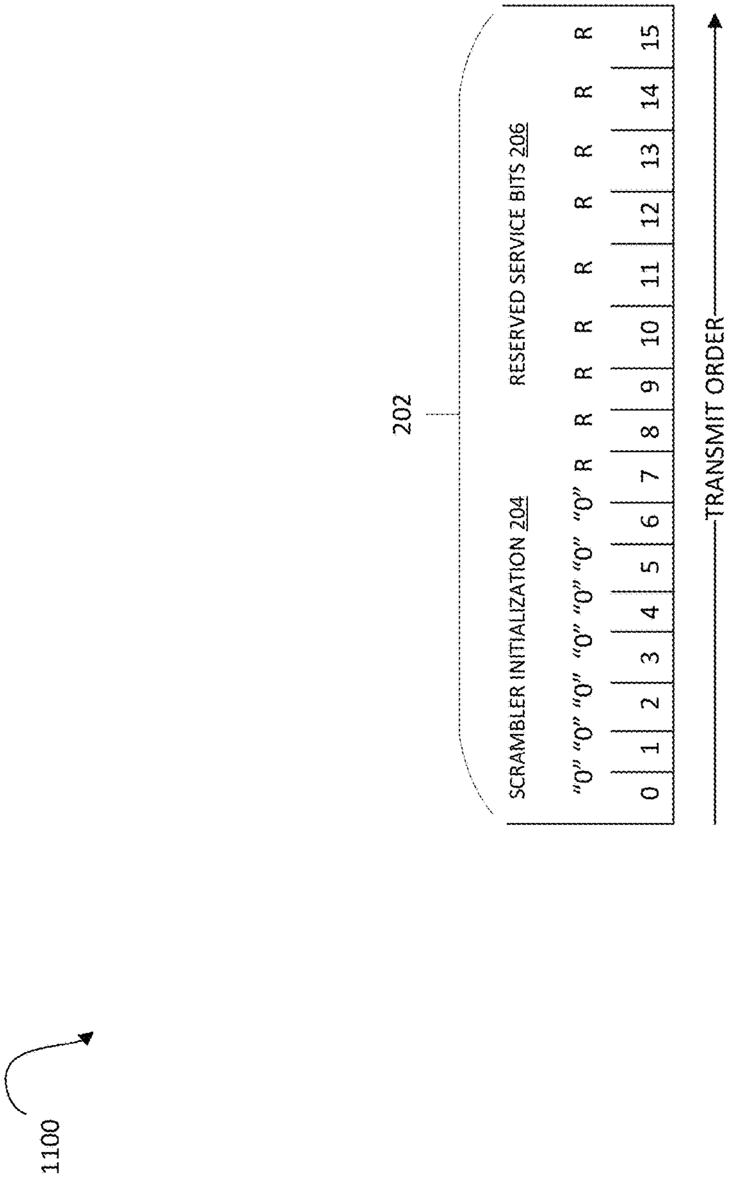
FIG. 11 is an illustration of an example scrambler seed extension operation, according to one or more embodiments.

FIG. 11 is an illustration 1100 of a scrambler seed extension operation, according to one or more embodiments. A service field 202 can follow a frame preamble and precede a frame payload. The service field 202 can include scrambler initialization bits 204 and reserve service bits 206. A legacy scrambler can use the seven scrambler initialization bits to generate a scrambler seed. In particular, the legacy scrambler can use the seven bits (e.g., short PPDU number) as salt for obfuscating the MAC header included in the payload, where the salt is a value used as an input for a one-way hashing function.

However, using seven bits results in only one hundred and twenty-seven variations. Therefore, a malicious attacker can discover the scrambler seed through brute force. To increase the number of bits, the herein described embodiments suggest using the reserve service bits 206 in addition to using the scrambler initialization bits 204. By using the reserve service bits 206, the scrambler seed can be extended to 2 octets, and this increases the number of possible variations increases to more than one hundred and twenty-seven possibilities.

FIG. 12 is a table 1200 describing the number of keys in secure scrambling, according to one or more embodiments. A device can identify a PPDU type based on reading the elements of a frame. For various reasons, the payload obfuscation may complicate the frame reception and the PPDU type may not be readily ascertainable. Without knowing the PPDU type, a device may be unable to retrieve the correct key for de-obfuscation. Additionally, if an association ID (AID) is not readily ascertainable, it can be difficult to discover the intended receiver device. The BSS Color field may help to discover the BSS in which the AID value belongs. This can be hinder communication when communicating with multiple devices. One approach 1202 is that a device (e.g., an AP) can use one key for transmitting to all other devices. For example, all other devices (STAs) use the same key for all UL frames. Each other device, in turn, has its own device-specific key for transmitting to the device (e.g., AP). Another approach 1204 is for a device (e.g., AP) to have separate keys for transmitting to each other. In turn, each other device uses the same key for transmitting to the device (e.g., AP). These scenarios are illustrated with respect to FIGS. 13-15.

Figure 13:
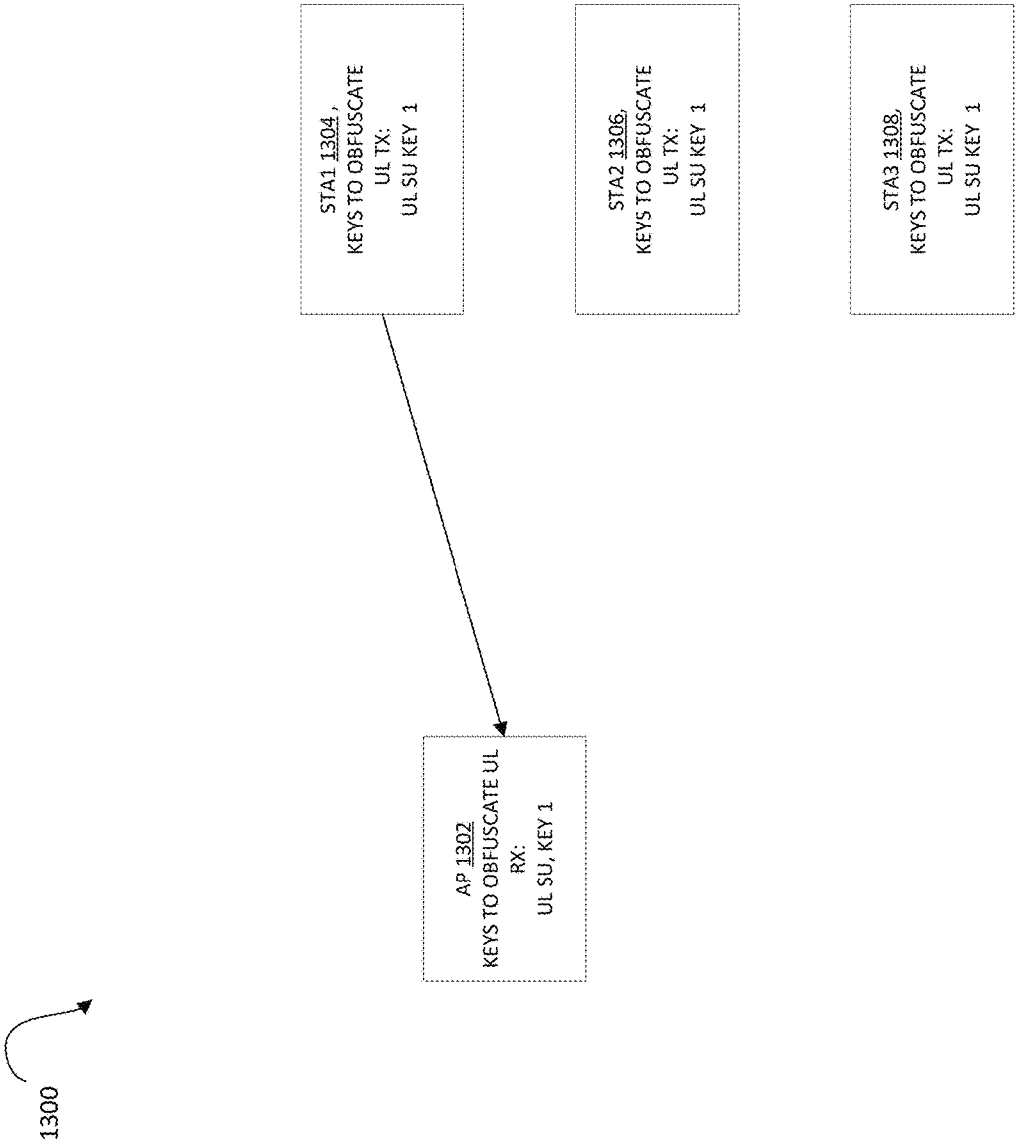
FIG. 13 is an illustration of an example for secure scrambling offsets of UL SU, according to one or more embodiments.

FIG. 13 is an illustration 1300 for secure scrambling offsets of UL SU, according to one or more embodiments. For UL transmissions, a first device (e.g., AP) 1302 can detect an incoming transmission. However, the first device 1302 cannot determine whether the transmission is received from a second device (e.g., STA1) 1304, a third device (e.g., STA2) 1306, or a fourth device (e.g., STA3) 1308. Therefore, if a device sends a SU frame to the first device 1302, the first device 1302 may not be able to de-obfuscate the message if each other has separate keys to obfuscate the payload. Therefore, the first device 1302 can assign the same key to all of the other devices. As illustrated each other device has the same keys to obfuscate and same UL SU Key 1. Therefore, the second device 1304 can scramble the transmission using the keys to scramble and the UL SU offset 1. The second device 1304 can further transmit the message to the first device 1302. The first device 1302 can receive the message from the second device 1304 and use its keys to descramble the message, regardless of the transmitting device. If the payload matches with frame check sequence (FCS), the first device 1302 can receive the frame. In some embodiments, the first device 1302 can have the additional capability to be able to detect the payload, even if it has assigned several offsets. For instance, the first device 1302 may be able to detect the payload on eight shared offsets that it has assigned.

Figure 14:
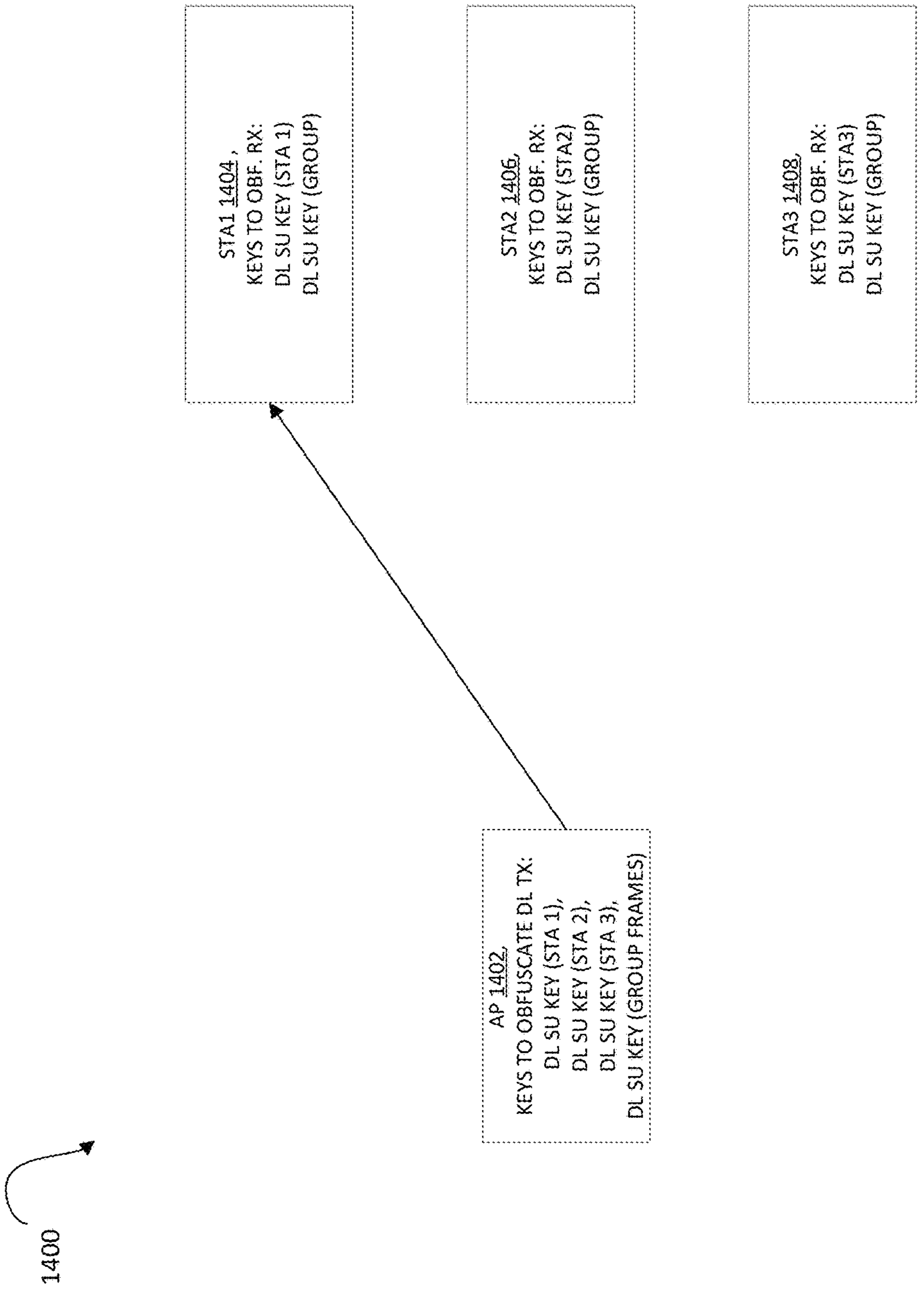
FIG. 14 is an illustration of an example for secure scrambling offsets of DL SU, according to one or more embodiments.

FIG. 14 is an illustration 1400 for secure scrambling offsets of DL SU, according to one or more embodiments. For DL transmissions, a first device (e.g., AP) 1402 can use a device specific key for transmissions. However, in this instance, the second device (e.g., STA1) 1404, the third device (e.g., STA2) 1406, and fourth device (e.g., STA3) 1408 may be configured to only receive the payload assigned to itself or a group addressed frame. As illustrated, each other device (e.g., the second device 1404, the third device 1406, and the fourth device 1408) can have a distinct DL SU Key to be used for individually addressed reception. Each of these other devices can receive a transmission that may be without an ascertainable AID. Therefore, the other device may not be able to detect the payload if it is not the intended recipient.

To resolve this, the first device 1402 can be configured to include device specific keys for each of the other devices. Therefore, the first device can obfuscate a message with a device specific key that only the intended recipient can de-obfuscate. Therefore, upon receipt of a message, the other device (e.g., the second device 1404, the third device 1406, or the fourth device 1408) can attempt to descramble the message using the device's DL SU key. If the payload matches with the FCS, the STA can receive the frame. If the payload does not match the FCS, the other device can discard the message. This ensures that DL transmissions may be received by the correct device. The group frames may have a separate key that for group addressed SU PPDU obfuscation. The same group offset value can be used for all the other device in a BSS.

Figure 15:
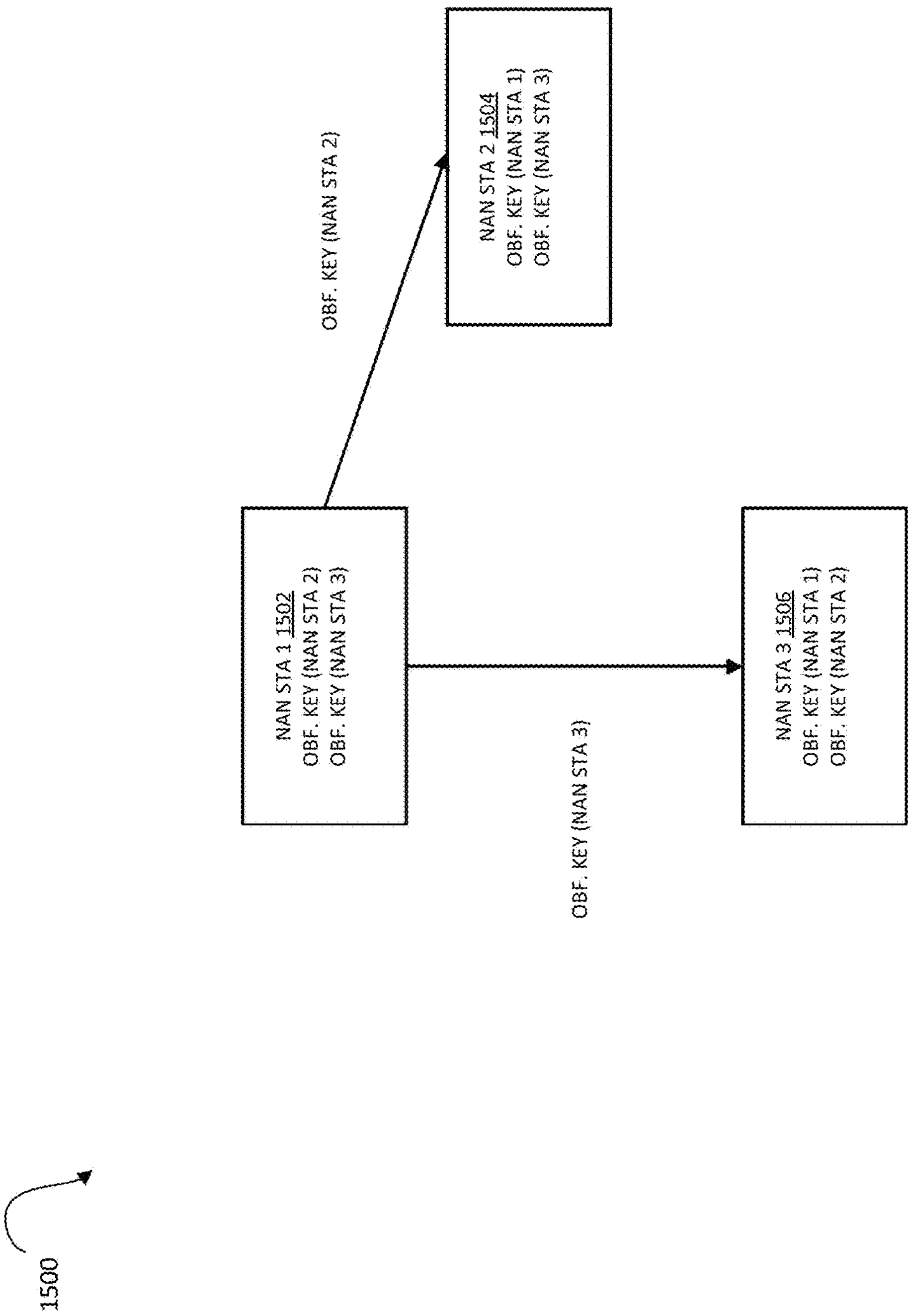
FIG. 15 is an illustration of an example for secure scrambling offsets in neighborhood awareness network (NAN)/Mesh networks, according to one or more embodiments.

FIG. 15 is an illustration 1500 for secure scrambling offsets in neighborhood awareness network (NAN)/Mesh networks, according to one or more embodiments. In NAN networks and Mesh networks a first device (e.g., NAN STA1 1502) may have a link setup with multiple other a second device (e.g., NAN STA2) 1504 and a third device (e.g., NAN STA3)1506. In some situations, multiple devices can transmit to the same device. Furthermore, each device can be configured with a different obfuscation offset. For example, both the first device 1502 and the second device 1404 can transmit to the third device 1506. Therefore, a receiving device needs to know the transmitting device and have the correct obfuscation key for de-obfuscation. To resolve this, each device can be configured with the obfuscation keys of the other devices. For example, when third device 1506 detects a reception, the third device 1506 can de-scramble the message by using the appropriate obfuscation keys as it has obfuscation keys of each other device. This simplifies frame reception but can require storing of multiple obfuscation keys.

Figure 16:
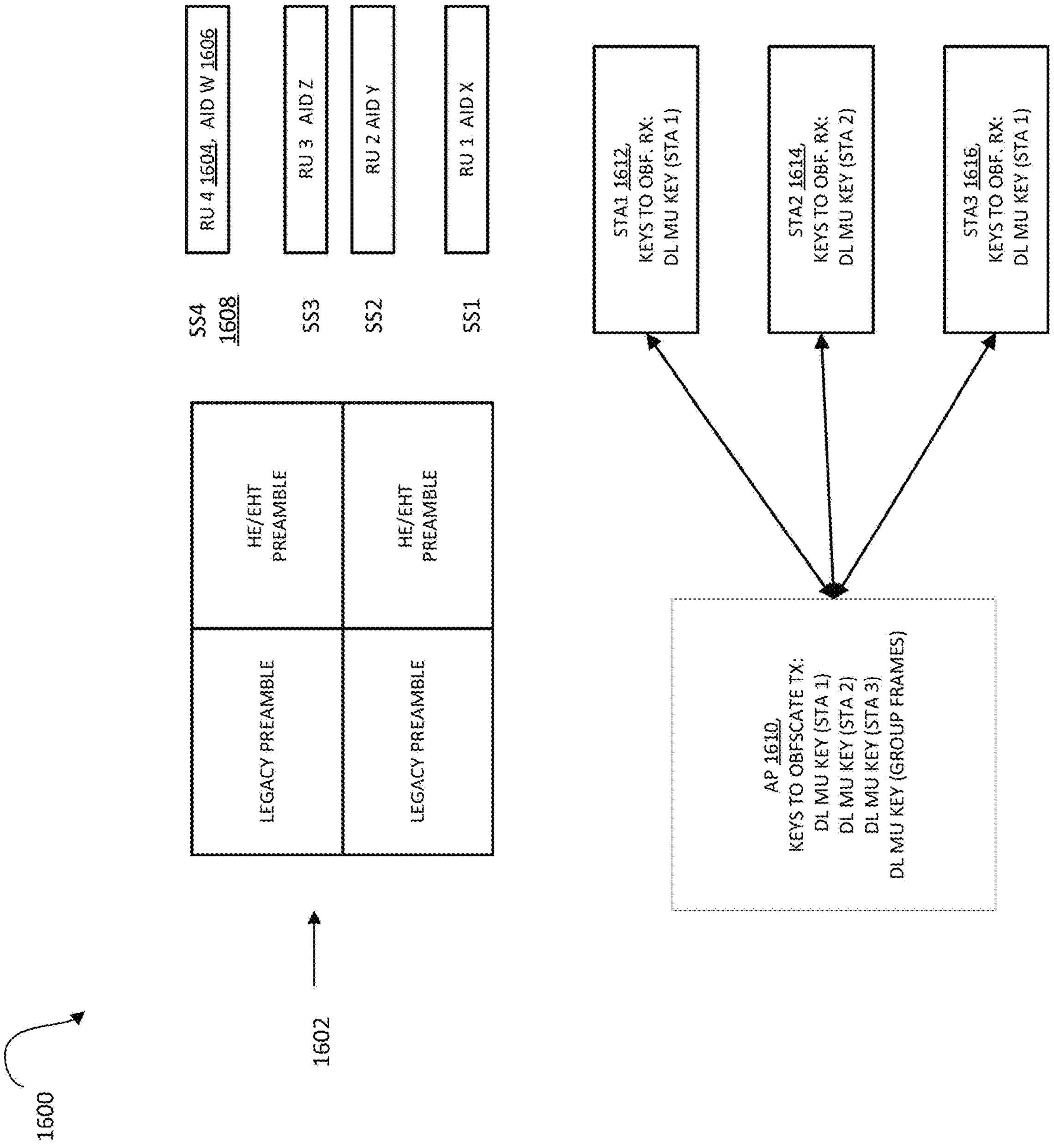
FIG. 16 is an illustration of an example for secure scrambling offset for MU PPDU, according to one or more embodiments.

FIG. 16 is an illustration 1600 for secure scrambling offset for MU PPDU, according to one or more embodiments. For an MU PPDU, a device (e.g., AP) can transmit to multiple other devices. Each transmitted frame can include a preamble 1602, and in particular the HE/EHT preamble, which can define the resource unit (RU) 1604 for carrying the frame, where each RU is a group of bandwidth carriers for UL and DL transmissions. The preamble can also define the AID 1606 that indicates the intended recipient of the frame. For each RU, a service field 1608 can be included. For MU PPDU, the recipient and scrambling type are obfuscated. Therefore, a first device 1610 can be configured with multiple device-specific DL MU keys and transmit frames to a second device (e.g., STA1) 1612, a third device (e.g., STA2) 1614, and forth device (e.g., STA3) 1616 using respective DL MU keys to obfuscate the frames. In turn, each of these devices can detect the AID in the frame and determine whether it should receive the frame. If a device determines that it is the intended recipient, it can try the RU and determine whether the payload matches with FCS. If there is a match the device can receive the frame, if there is no match, the device can discard the frame. In some embodiments, the DL SU key and DL MU key can have the same value, or device can have a separate key for both.

Figure 17:
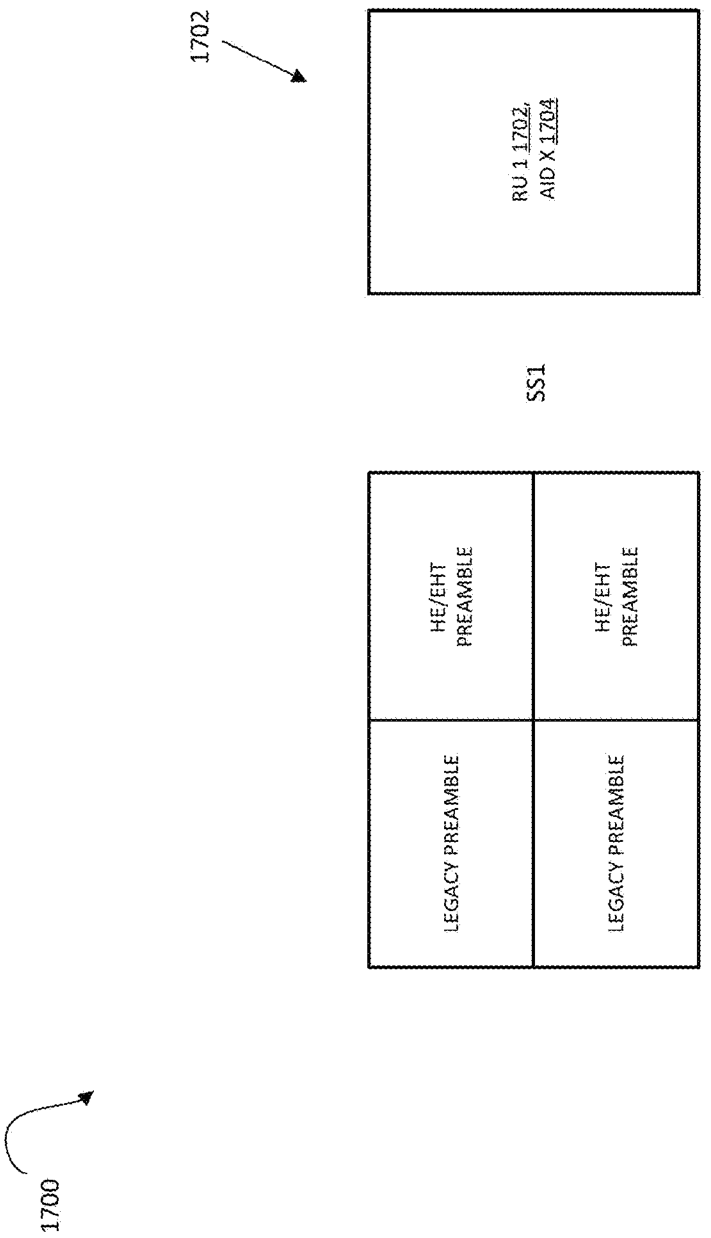
FIG. 17 is an illustration of an example of using MU PPDU for UL transmissions, according to one or more embodiments.

FIG. 17 is an illustration 1700 of using MU PPDU for UL transmissions, according to one or more embodiments. As illustrated a first device (e.g., STA) can use a UL MU PPDU to transmit to a second device (e.g., AP). Generally, only a single RU 1702 is used for this transmission. The UL MU PPDU can carry the AID X 1704, and the AID X 1704 can be used by the AP to detect the transmitter. This scheme allows for the first device to use first device specific scrambling keys. The second device can identify the transmitting first device from the AID and can apply the correct scrambling key to descramble the payload. In some embodiments, a network can send a command for all UL data frames to be sent in MU PPDUs. This can ensure that all the transmitted data is securely scrambled. Additionally, a BSS can also adopt a rule that when the payload is transmitted, MU PPDU is used, if the payload is greater than a threshold number of octets or if the payload transmission is longer than a threshold time.

Figure 18:
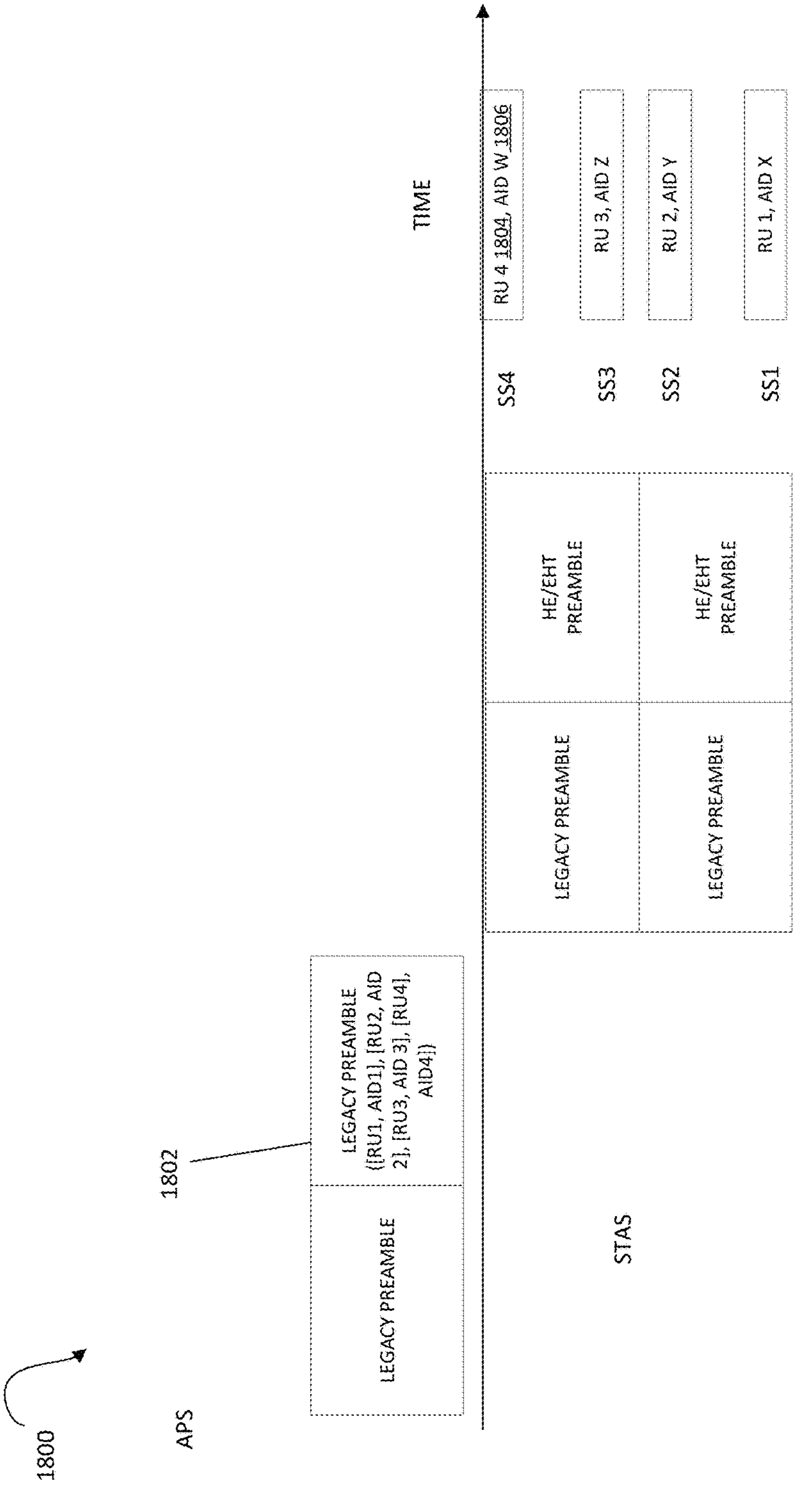
FIG. 18 is an illustration of an example for secure scrambling offsets of triggered PPDU, according to one or more embodiments.
Figure 19:
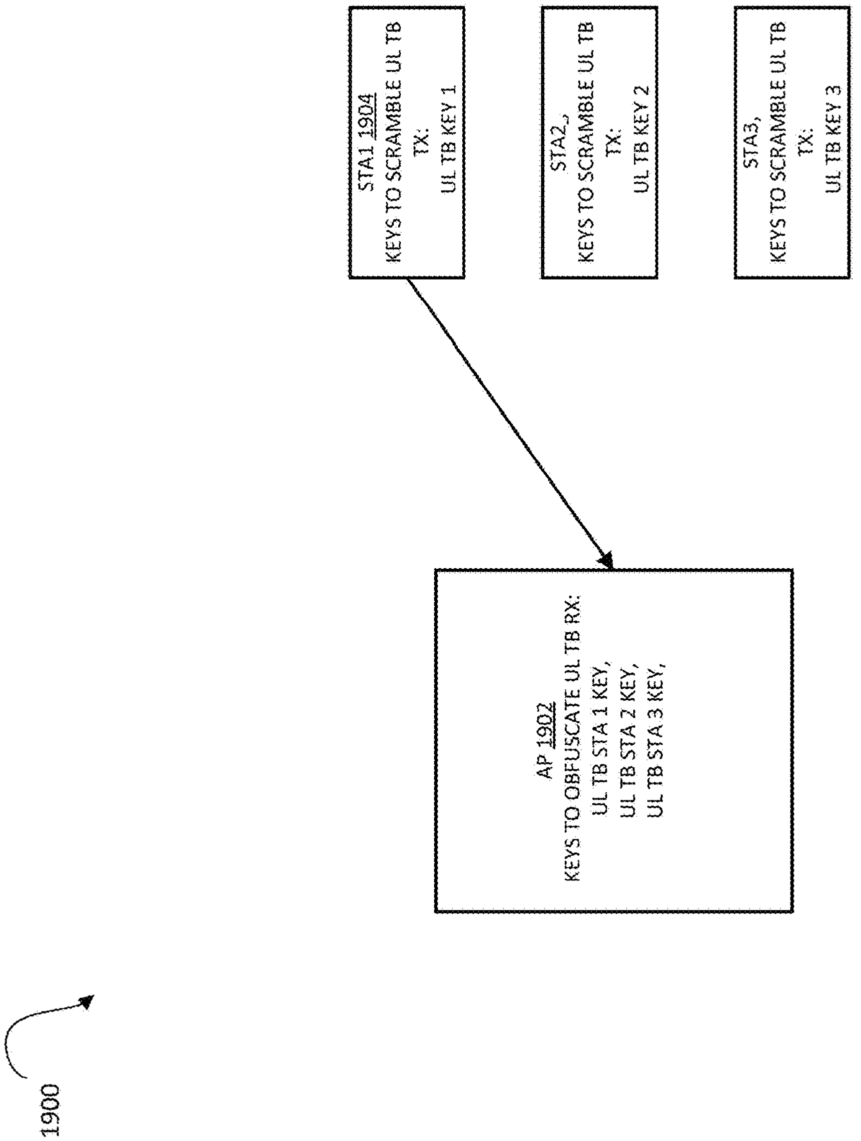
FIG. 19 is an illustration of an example for secure scrambling offsets of triggered PPDU, according to one or more embodiments.

FIG. 18 is an illustration 1800 for secure scrambling offsets of triggered PPDU, according to one or more embodiments. A first device (e.g., AP) can transmit a trigger frame 1802, which can indicate the respective RU 1804, and AID 1806. Upon reception, a second device (e.g., STA) can determine whether it has been allocated an RU based on the trigger frame 1802. If the second device has been allocated an RU, it can transmit on the RU. The respective service field values can be used as an RU specific PPDU number. The PPDU type (e.g., SU or MU) specific address detection can be performed with respect to trigger frame addresses. The first device can assume that if the triggered second device will respond, and the first device can apply the offset of the triggered second device. FIG. 19 is an illustration 1900 for secure scrambling offsets of triggered PPDU, according to one or more embodiments. The first device 1902 (e.g., AP) can be configured to store respective offsets for multiple STAs. The first device 1902 can transmit a trigger frame that is received by a second device (e.g., STA1) 1904. The first device 1902 can assume that the second device 1904 will read the AID in the trigger frame and use the allocated RU to respond. The first device 1902 can further use the stored UL TP STA1 key to descramble the response from the second device 1904.

Figure 20:
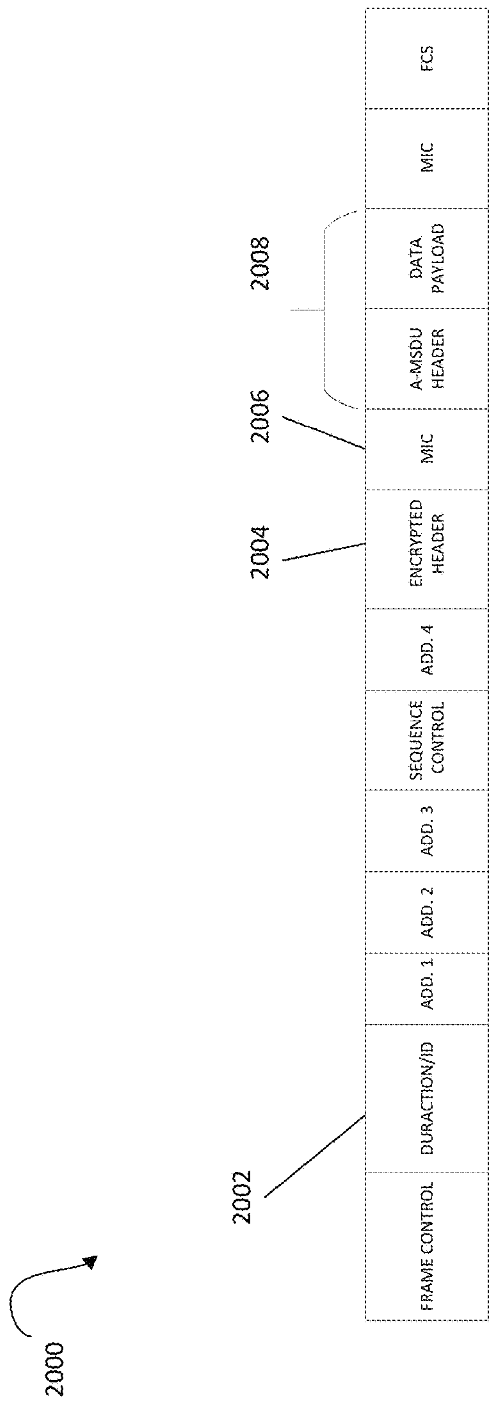
FIG. 20 is an illustration of an example for encryption-based secure scrambling, according to one or more embodiments.

FIG. 20 is an illustration 2000 for encryption-based secure scrambling, according to one or more embodiments. FIG. 20 relates to the second alternative. As illustrated FIG. 20 introduces the idea of a frame 2002 with an encrypted header 2004 and a message integrity check (MIC) field 2006 that follows the encrypted header 2004. The payload 2008 can be encrypted as described in IEEE 80.11. The encrypted header 2004 can, however, be encrypted differently than the payload 2008. Once the device encrypts the header, the encrypted header 2004 is added as a block cipher having a 16-octet size to the frame 2002. The encrypted header 2004 can include a QoS control field, a HT control field, a CCMP header or a GCMP header, a frame control field. The CCMP header or the GCMP header can include a MPDU specific value that can be used to encrypt the fields to generate the encrypted header. The MIC field 2006 can be added to the frame 2002 to protect the integrity of the encrypted header 2002. The MIC field 2006 can be 2 octets or 4 octets.

Figure 21:
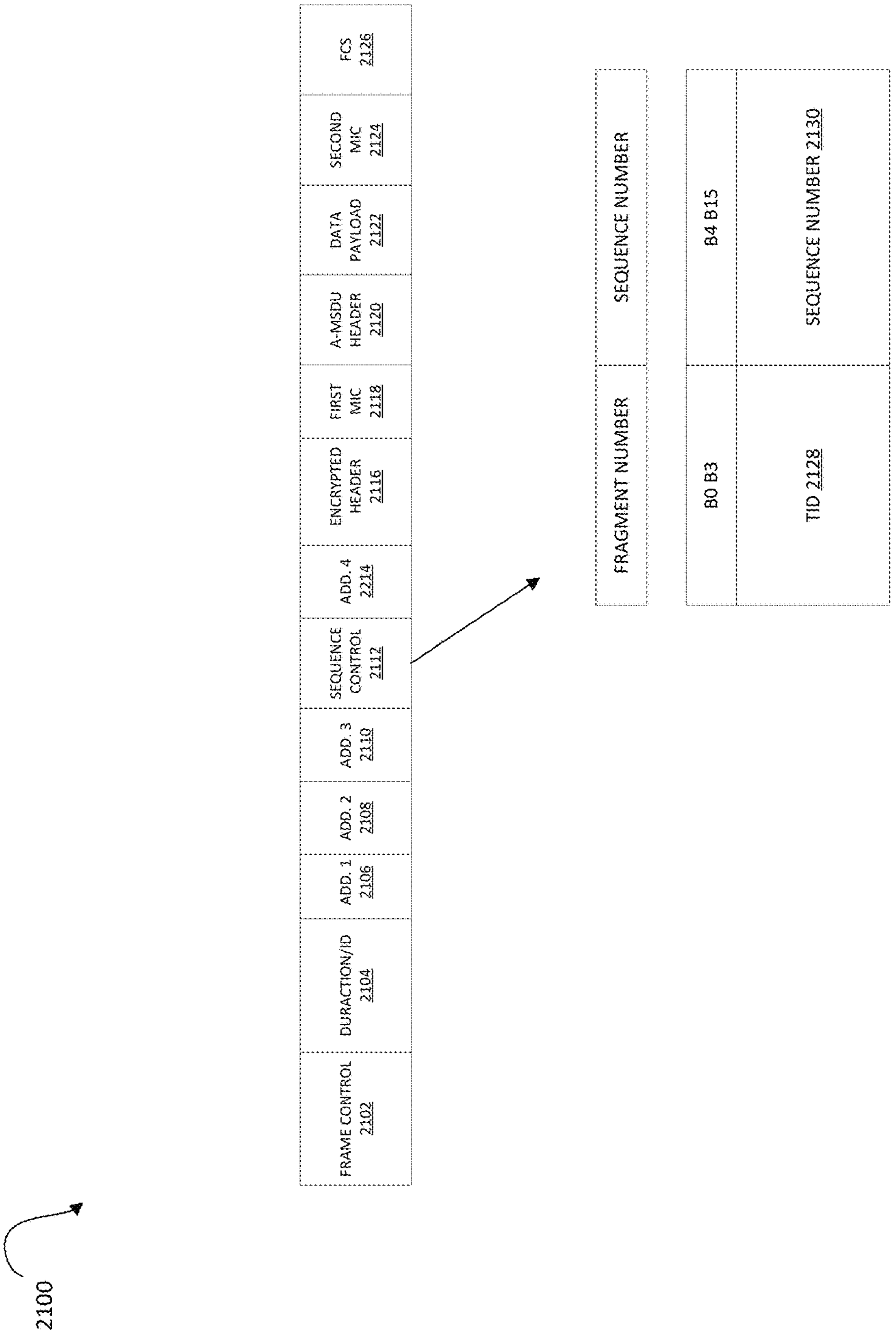
FIG. 21 is an illustration of an example frame describing obfuscation and encryption, according to one or more embodiments.

FIG. 21 is an illustration a frame 2100 describing obfuscation and encryption, according to one or more embodiments. FIG. 21 provides examples of fields that can be selected for obfuscation or encryption. The frame 2100 can include frame control field 2102, which is discussed with more detail at FIG. 22. The frame 2100 can further include a Duration/TD field 2104, which can remain transmitted clear in an over the air transmission. The frame 2100 can further include a first address (ADD. 1) field 2106, a second address (ADD. 2) field 2108, a third address (ADD. 3) field 2110, a sequence control field 2112, and a fourth address (ADD. 4) field 2214. The device can apply an offset to obfuscate the values in these fields. The frame 2100 can further include an encrypted header field 2116 that the device can encrypt differently than the payload of the frame 2100. The frame 2100 can include a first MIC field 2128, an A-MDSU header field 2120, and a data payload field 2122. These fields can be encrypted as described in IEEE 802.11 The frame 300 can further include a second MIC field 2124 and an FCS field 2126. The device can transmit these fields as clear over the air. The sequence control for the frame can include a four-bit traffic identifier 2128 followed by a twelve bit sequence number 2130.

Figure 22:
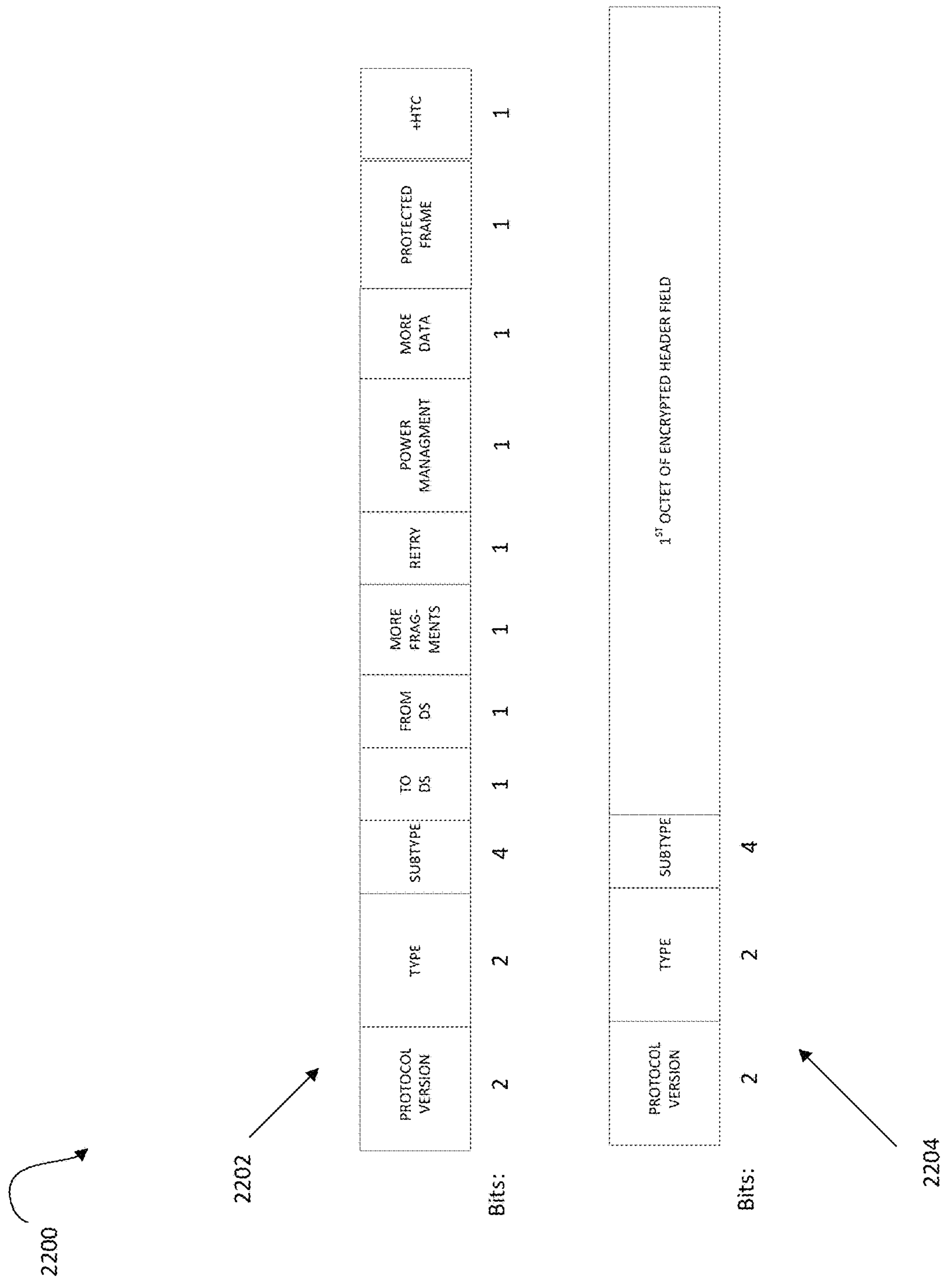
FIG. 22 is an illustration of example subfields of a frame control field, according to one or more embodiments.

FIG. 22 is an illustration 2200 of subfields of a frame control field, according to one or more embodiments. As a first option 2202, the device can transmit the protocol version, type and subtypes subfields as clear for an over the air transmission. The device can set the TD DS, From DS, More Fragments, Retry, Power Management, More Data, protected frame and +HTC fields to zero. A second option 2204, the device can transmit the protocol version, type, and subtype subfields as clear for an over the air transmission. The device can further set the first octet of the encrypted header field to zero.

Figure 23:
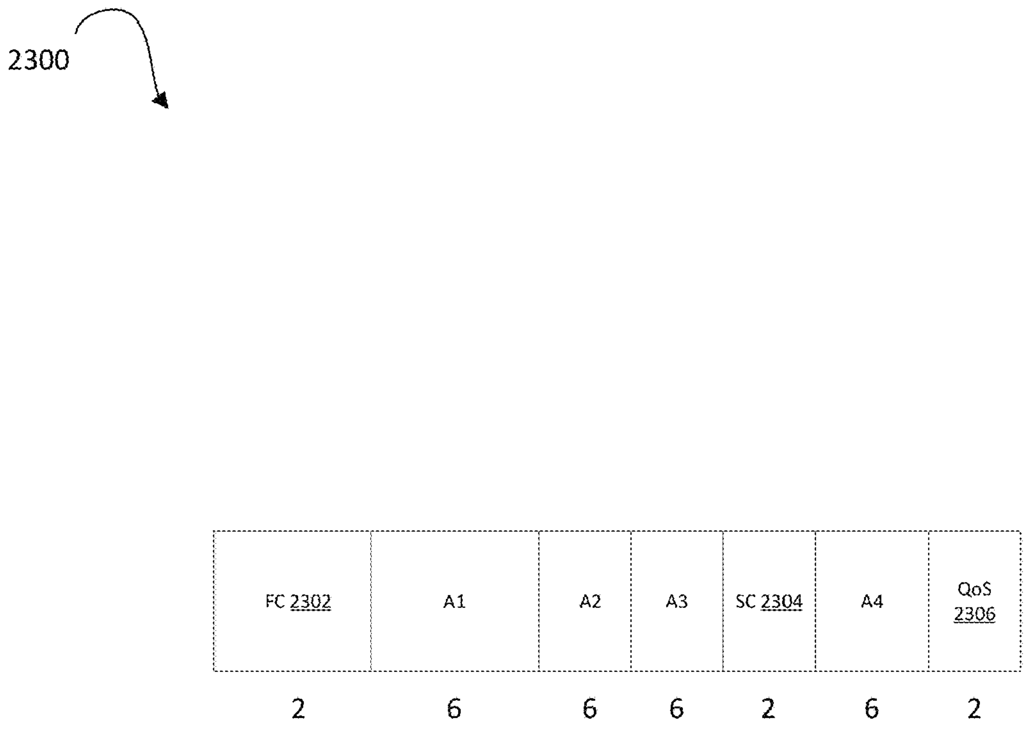
FIG. 23 is an illustration of an example additional authentication data field, according one or more embodiments.

FIG. 23 is an illustration of an additional authentication data field 2300, according one or more embodiments. IEEE 802.11 can specify for the creation of an additional authenticated data (AAD) field for CCMP and GCMP ciphers. The encrypted header can be a CCMP or GCMP cipher. The illustrated can differ from IEEE 802.11 in that the second octet of the Frame Control (FC) field 2302 can be punctured to 0, only the first four bits of the Sequence Control (SC) field 2304 are included, and the other bits are punctured, and the QoS control field is punctured to 0. During a MPDU payload encryption, the device can use the clear field values (e.g., without application of offsets). The encrypted header field can be encrypted using the OTA values of the fields as received from the frame. These OTA values can be used, because packet encryption is real time operation and should be applied to the frame as it is.

Figure 24:
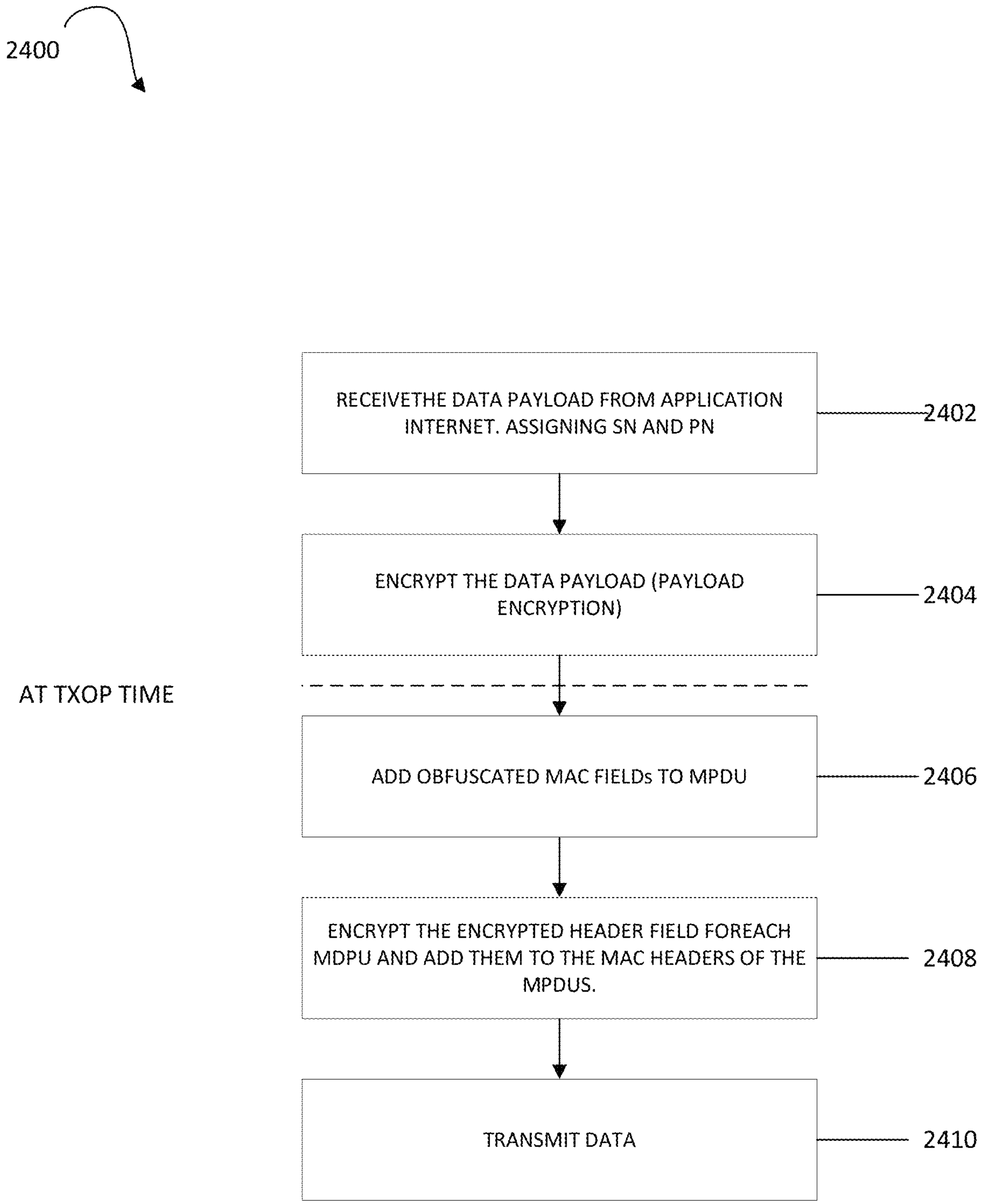
FIG. 24 is an example process flow for a transmitter operation, according to one or more embodiments.

FIG. 24 is a process flow 2400 for a transmitter operation, according to one or more embodiments. At 2402, a device can receive a data payload from an application or the internet. The data payload can be included in a physical layer protocol data unit (PPDU) transmission. In response to receiving the data payload, the device can assign the payload a sequence number (SN) and a packet number (PN).

At 2404, the device can encrypt the data payload.

At 2406, the device can add obfuscate MAC fields to an each MDPU. In some instances, step 2406 can occur at the next transmission opportunity (TXOP) time that occurs after encrypting the payload (step 2404).

At 2408, the device can encrypt the encrypted header field for each MPDU and the fields to the MAC headers of the MPDUs.

At 2410, the device can transmit the data to a receiving device. For example, the device can be a transmitting device such as an access point and the receiving device can be a station that connects to a wireless local area network provided by the access point.

Figure 25:
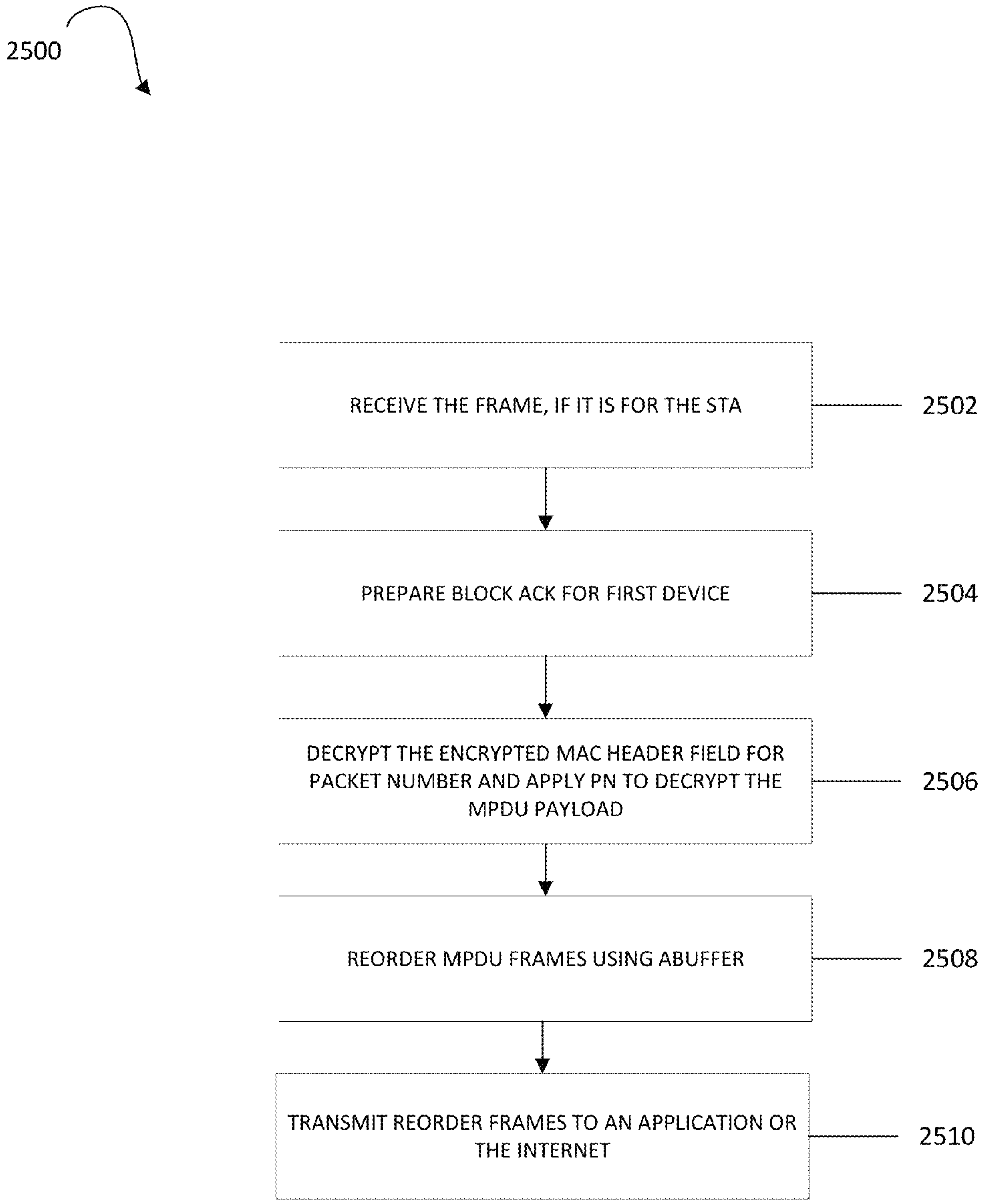
FIG. 25 is an example process flow for a transmitter operation, according to one or more embodiments.

FIG. 25 is a process flow 2500 for a receiver operation, according to one or more embodiments. At 2502, a device can receive a frame from a transmitting device. The device can be, for example, a station in an environment. The device can receive the frame over the air and further determine whether the device is the intended recipient. For example, the device can determine whether the transmitter address and the receiver address match the device information. If there is a match the device can receive the frame. If there is no match, the device can discard the frame. The device can further determine the duration of the PPDU transmission from the preamble of the frame. The duration can be set in a TXOP field of the preamble or a duration field. The frame can be received, for example, from the device of FIG. 24.

At 2504, the device can prepare a block acknowledgment for the device.

At 2506, the device can decrypt the encrypted MAC header field for the packet number.

At 2508, the device can reorder the MPDU frames using a buffer.

At 2510, the device can transmit the reordered frames to an application or internet.

Figure 26:
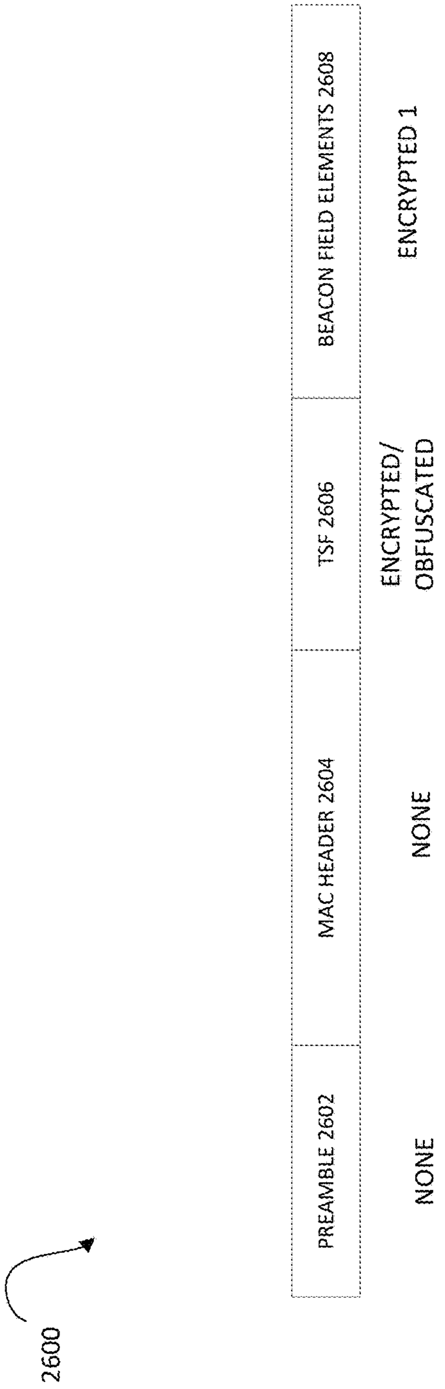
FIG. 26 is an example illustration of a beacon frame, according to one or more embodiments.

FIG. 26 is an illustration of a beacon frame 2600, according to one or more embodiments. The beacon frame 2600 can include a preamble 2602, a medium access control header 2604, a timing synchronization field 2606, and beacon field elements 2608. It should be appreciated that in a conventional beacon frame, the timing synchronization field is included IN the beacon field elements 2608. As described herein, for transmission, a device can elect not to encrypt the preamble 2602. The device can obfuscate the MAC header addresses. The device can further apply an offset to the timing synchronization field 2606 without affecting any of the other fields. The offset value can further be generated prior to generating the beacon frame to quicken the process. Even further, the device can encrypt the beacon field elements 2608 without encrypting the timing synchronization field 2606. For example, the encryption tool can be configured to ignore the timing synchronization field 2606.

Figure 27:
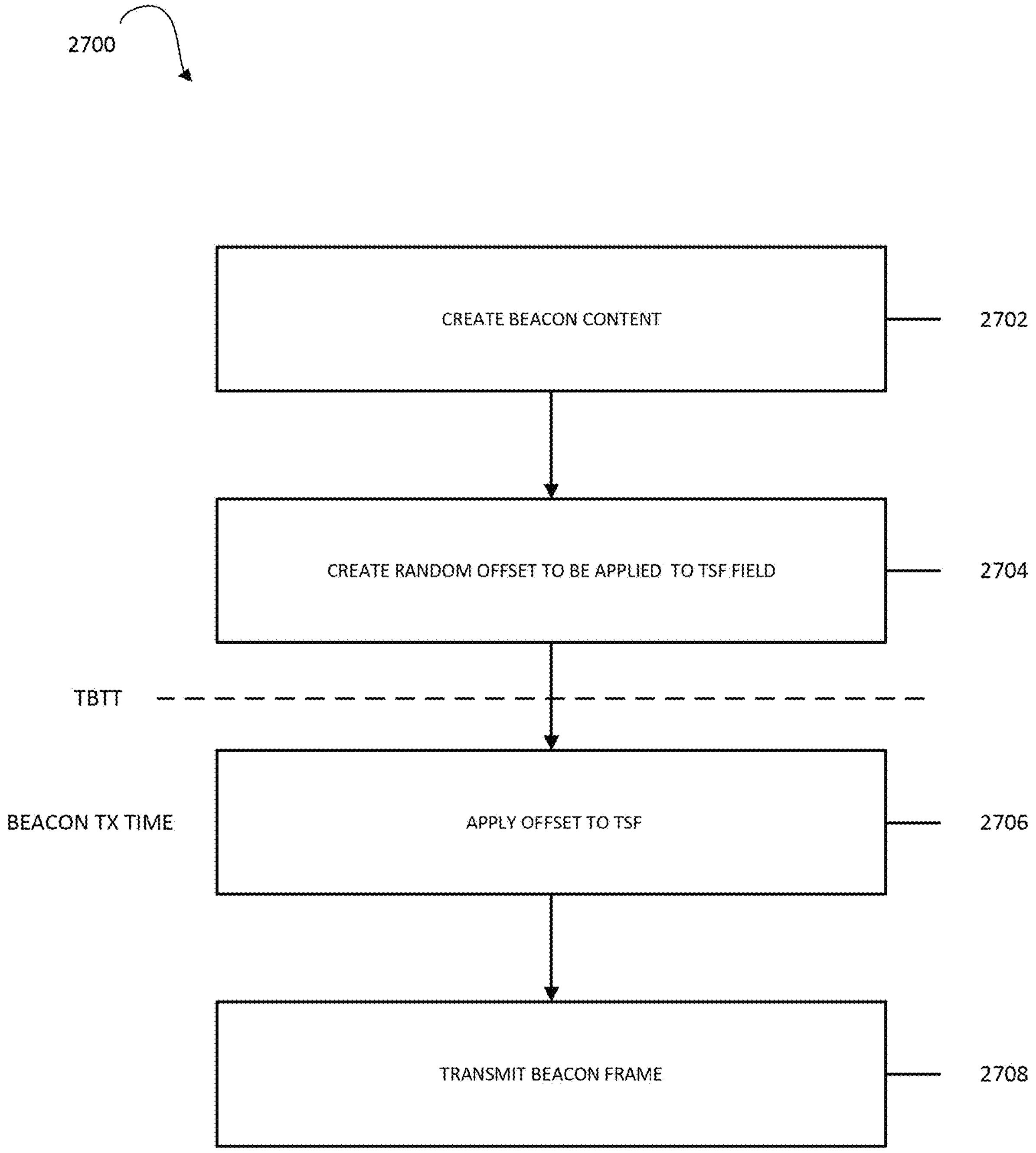
FIG. 27 is an example process flow for generating a timing synchronization field independent beacon frame.

FIG. 27 is a process flow 2700 for generating a timing synchronization field independent beacon frame. At 2702, a device can create beacon content to be included in a beacon frame. The content can include a change sequence number, a traffic indication map, a reduced neighbor report, and optional elements.

At 2704, the device can create a random offset that is to be applied to the timing synchronization field of the beacon frame. For example, the device can apply the above referenced expression.

The current WLAN transmission rules define that at TSF value 0, the device has transmitted a Beacon. This causes a situation that every time the TSF value is multiple of Beacon interval value, the AP should transmit a Beacon frame, i.e., these TSF values are considered as TBTT times.

When the offset is added to the TSF value, then the TBTT may occur when TSF mod(Beacon Interval)=0. In this situation, the offset value selection may have limitations to ensure that beacons are not transmitted too frequently or too seldom. For instance, purely random offset may cause Beacon frame interval to be from 0 to two times the duration of the Beacon transmission interval. The maximum allowed beacon frame transmission interval may be limited to between 50% and 150% of the Beacon transmission interval.

If the beacon transmission interval does not change very often, the associated devices and scanning devices may easily detect the next Beacon transmission time. These devices may use of the same rule to determine the Beacon transmission time from the TSF as used for the legacy beacons that have no offset applied to OTA TSF field value.

If the TBTT may occur at any TSF value, then the transmitter may select the offset value more freely. In this approach, the transmitter and receivers may have a joint algorithm to calculate the TSF offset and the TBTT of the next Beacon frame.

At 2706, the device can apply the offset to the timing synchronization field. This can be based on a passing of the target beacon transmission time (TBTT).

At 2708, the device can transmit the beacon frame. For example, the device can transmit the beacon frame to another device in a basic service set (BSS).

Figure 28:
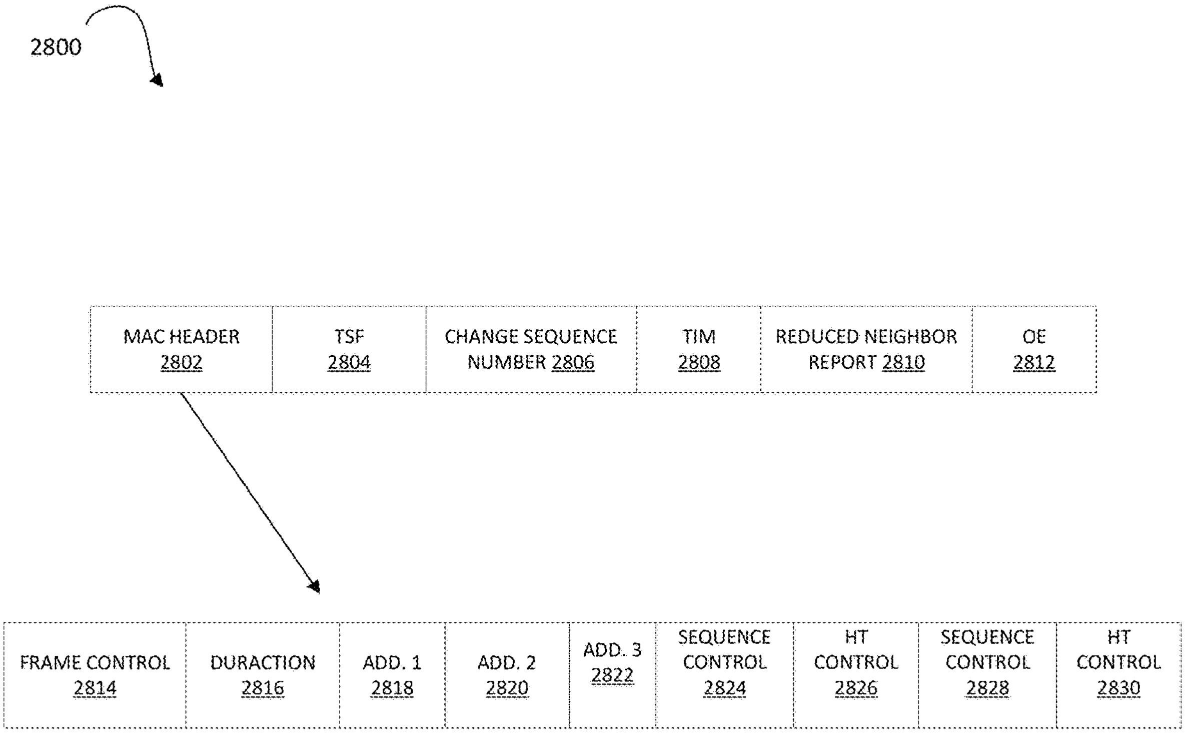
FIG. 28 is an example of a beacon frame with timing synchronization field (TSF) obfuscation according to one or more embodiments.

FIG. 28 is an example of a beacon frame 2800 with TSF obfuscation according to one or more embodiments. The beacon frame can include a MAC header field 2802, a timing synchronization function field 2804, a change sequence number field 2806, traffic indication map field 2808, a reduced neighbor report field 2810, and an optional elements field 2812. As part of the payload encryption process, the change sequence number field 2806, a traffic indication map field 2810, the reduced neighbor report field 2810, and the optional elements field 3812 can be encrypted, while the timing synchronization function field 2804 can be obfuscated by applying an offset.

The MAC header field can include a frame control subfield 2814, a duration subfield 2816, a first address subfield 2818, a second address subfield 2820, a third address subfield 2822, a sequence control subfield 2824, and HT control subfield 2826, a sequence control subfield 2828, and HT control 2830 subfield. The first address subfield 2818 can include a receiving device address, the second address subfield 2818 can include a random ID, and a third address subfield 2822 can include a checksum ID.

The beacon transmission interval should be changed at least when the AP/BSS identifier (Random ID or Checksum Id) in the Beacon frame is changed. This ensures that eavesdroppers cannot identify the AP with new identifier values from the TBTT interval.

For one or more embodiments, at least one of the components set forth in one or more of the preceding figures may be configured to perform one or more operations, techniques, processes, or methods as set forth in the example section below.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising;

by a first communication device:

- creating a beacon field to be included in a beacon frame;
- generating a timing synchronization field to be included in the beacon frame;
- applying an offset to the timing synchronization field of the beacon frame to create an offset timing synchronization field;
- obfuscating the offset timing synchronization field based at least in part on applying the offset;
- encrypting the beacon frame based at least in part on the obfuscation of the timing synchronization field; and
- transmitting the encrypted beacon frame to a second communication device, the encrypted beacon frame comprising the obfuscated offset timing synchronization field and the beacon field.

2. The method of claim 1, wherein the method further comprises encrypting the beacon field separately from the timing synchronization field.

3. The method of claim 1, wherein the first communication device and the second communication device are configured to comprise a same key to decrypt the obfuscated offset timing synchronization field.

4. The method of claim 1, wherein the first communication device is configured to have a second communication device specific key for decrypting the obfuscated offset timing synchronization field.

5. The method of claim 1, wherein applying the offset comprises performing an "exclusive or" operation on an original timing synchronization field value and the offset.

6. The method of claim 1, wherein the offset applied to the timing synchronization field is a same as a separate offset applied to a medium access control header of the beacon frame.

7. The method of claim 1, wherein a timing of the applying the offset to the timing synchronization field is based at least in part on a target beacon transmission time.

8. A first communication device, comprising:

one or more processors; and one or more computer-readable media including instructions that, when executed, cause the one or more processors to:

- create a beacon field to be included in a beacon frame;
- generate a timing synchronization field to be included in the beacon frame;
- apply an offset to the timing synchronization field of the beacon frame to create an offset timing synchronization field;
- obfuscate the offset timing synchronization field based at least in part on applying the offset;
- encrypt the beacon frame based at least in part on the obfuscation of the offset timing synchronization field; and
- transmit the encrypted beacon frame to a second communication device, the encrypted beacon frame comprising the obfuscated offset timing synchronization field and the beacon field.

9. The first communication device of claim 8, wherein the instructions that, when executed by the one or more processors, further causes the one or more processors to perform operating comprising encrypting the beacon field, wherein the beacon field is encrypted separately from the timing synchronization field.

10. The first communication device of claim 8, wherein the first communication device and the second communication device are configured to comprise a same key to decrypt the obfuscated offset timing synchronization field.

11. The first communication device of claim 8, wherein the first communication device is configured to have a second communication device specific key for decrypting the obfuscated offset timing synchronization field.

12. The first communication device of claim 8, wherein applying the offset comprises performing an "exclusive or" operation on an original timing synchronization field value and the offset.

13. The first communication device of claim 8, wherein the offset applied to the timing synchronization field is a same as a separate offset applied to a medium access control header of the beacon frame.

14. The first communication device of claim 8, wherein a timing of the applying the offset to the timing synchronization field is based at least in part on a target beacon transmission time.

15. One or more non-transitory, computer-readable media having stored thereon a sequence of instructions which, when executed, causes one or more processors of a first communication device to:

- create a beacon field to be included in a beacon frame;
- generate a timing synchronization field to be included in the beacon frame;

apply an offset to the timing synchronization field of the beacon frame to create an offset timing synchronization field;

obfuscate the offset timing synchronization field based at least in part on applying the offset;

encrypt the beacon frame based at least in part on the obfuscation of the timing synchronization field; and transmit the beacon frame to a second communication device, the beacon frame comprising the offset timing synchronization field and the beacon field.

16. The one or more non-transitory, computer-readable media of claim 15, wherein the instructions that, when executed, further cause the one or more processors to encrypt the beacon field, wherein the beacon field is encrypted separately from the timing synchronization field.

17. The one or more non-transitory, computer-readable media of claim 15, wherein the first communication device and the second communication device are configured to comprise a same key to decrypt the obfuscated offset timing synchronization field.

18. The one or more non-transitory, computer-readable media of claim 15, wherein the first communication device is configured to have a second communication device specific key for decrypting the obfuscated offset timing synchronization field.

19. The one or more non-transitory, computer-readable media of claim 15, wherein applying the offset comprises performing an "exclusive or" operation on an original timing synchronization field value and the offset.

20. The one or more non-transitory, computer-readable media of claim 15, wherein the offset applied to the timing synchronization field is a same as a separate offset applied to a medium access control header of the beacon frame.

* * * * *